US011893621B2

(12) United States Patent
Uraki

(10) Patent No.: US 11,893,621 B2
(45) Date of Patent: Feb. 6, 2024

(54) MERCHANDISE SALES PROCESSING SYSTEM

(71) Applicant: TOSHIBA TEC KABUSHIKI KAISHA, Tokyo (JP)

(72) Inventor: Keisuke Uraki, Koto Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 17/547,506

(22) Filed: Dec. 10, 2021

(65) Prior Publication Data
US 2022/0292581 A1 Sep. 15, 2022

(30) Foreign Application Priority Data
Mar. 12, 2021 (JP) ................. 2021-040025

(51) Int. Cl.
*G06Q 30/0601* (2023.01)
*G06Q 10/087* (2023.01)

(52) U.S. Cl.
CPC ....... *G06Q 30/0635* (2013.01); *G06Q 10/087* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 5,970,474 A * | 10/1999 | LeRoy | ................ | G06Q 30/06 705/26.61 |
| 8,401,914 B1 * | 3/2013 | Kim | ................ | G06Q 30/0641 705/26.1 |
| 10,318,569 B1 * | 6/2019 | Funk | ................ | G06Q 20/3278 |
| 10,572,932 B2 * | 2/2020 | Kumar | ............... | G06Q 30/0639 |
| 10,878,669 B2 | 12/2020 | Ugajin | | |
| 2004/0254676 A1 * | 12/2004 | Blust | .................... | G06Q 10/087 700/231 |
| 2012/0036014 A1 * | 2/2012 | Sunkada | ............ | G06Q 30/0261 705/14.54 |
| 2014/0379526 A1 * | 12/2014 | Parham | .............. | G06Q 30/0633 705/26.41 |
| 2015/0081466 A1 * | 3/2015 | Sakurai | .............. | G06Q 30/0601 705/26.1 |
| 2018/0218441 A1 * | 8/2018 | Kumar | ............... | G06Q 30/0639 |
| 2018/0330318 A1 * | 11/2018 | Alaparthy | ............ | G06Q 10/087 |
| 2020/0034783 A1 * | 1/2020 | Tsuchimochi | .......... | G09F 3/208 |

OTHER PUBLICATIONS

Anon., "CDW Computer Centers Takes Online Shopping to the Next Level," Business Wire [New York] May 18, 1998: 1. (Year: 1998).*
Anon., "RadioShack Re-Launches E-Commerce Web Site for Enhanced Customer Experience," PR Newswire [New York] Oct. 26, 2005: 1. (Year: 2005).*

* cited by examiner

*Primary Examiner* — Nicholas D Rosen
(74) *Attorney, Agent, or Firm* — FOLEY & LARDNER LLP

(57) ABSTRACT

A merchandise sales processing system includes one or more processors configured to receive indications to register items of merchandise for purchase, generate a registration list in which the items of merchandise are set as merchandise to be purchased, settle prices relating to the merchandise to be purchased that are included in the registration list in response to receiving a settlement request, and set a respective item of merchandise as a reserved merchandise in response to the respective item of merchandise being out of stock.

18 Claims, 21 Drawing Sheets

MERCHANDISE SALES PROCESSING SYSTEM

CROSS-REFERENCE TO RELATED PATENT APPLICATION

This application is based upon and claims the benefit of priority from Japanese Patent Application No. 2021-040025, filed on Mar. 12, 2021, the entire contents of which are incorporated herein by reference.

FIELD

Embodiments described herein relate generally to a merchandise sales processing system.

BACKGROUND

At a store where merchandise is displayed and sold, a customer selects and purchases a desired merchandise from the displayed merchandise. An out-of-stock merchandise cannot be purchased.

A service by which a clerk asks contact information of a customer and informs the customer of an arrival of an out-of-stock merchandise arrives is known, but the service becomes a heavy burden to the clerk.

In such a circumstance, it is desired to easily reserve an out-of-stock merchandise.

DETAILED DESCRIPTION

An object to be solved by exemplary embodiments is to provide a merchandise sales processing system in which an out-of-stock merchandise can be easily reserved.

In general, according to one embodiment, a merchandise sales processing system includes a determination means, a generation means, a settlement means, and a decision means. The determination means determines a merchandise. The generation means generates a list in which the merchandise determined by the determination means are set as merchandise to be purchased. The settlement means settles prices relating to the merchandise to be purchased that are included in the list generated by the generation means. If the merchandise to be purchased determined by the determination means is out of stock, the decision means determines the merchandise to be purchased as a reserved merchandise.

Hereinafter, an embodiment of a merchandise sales processing system is described with reference to the drawings.

Figure 1:
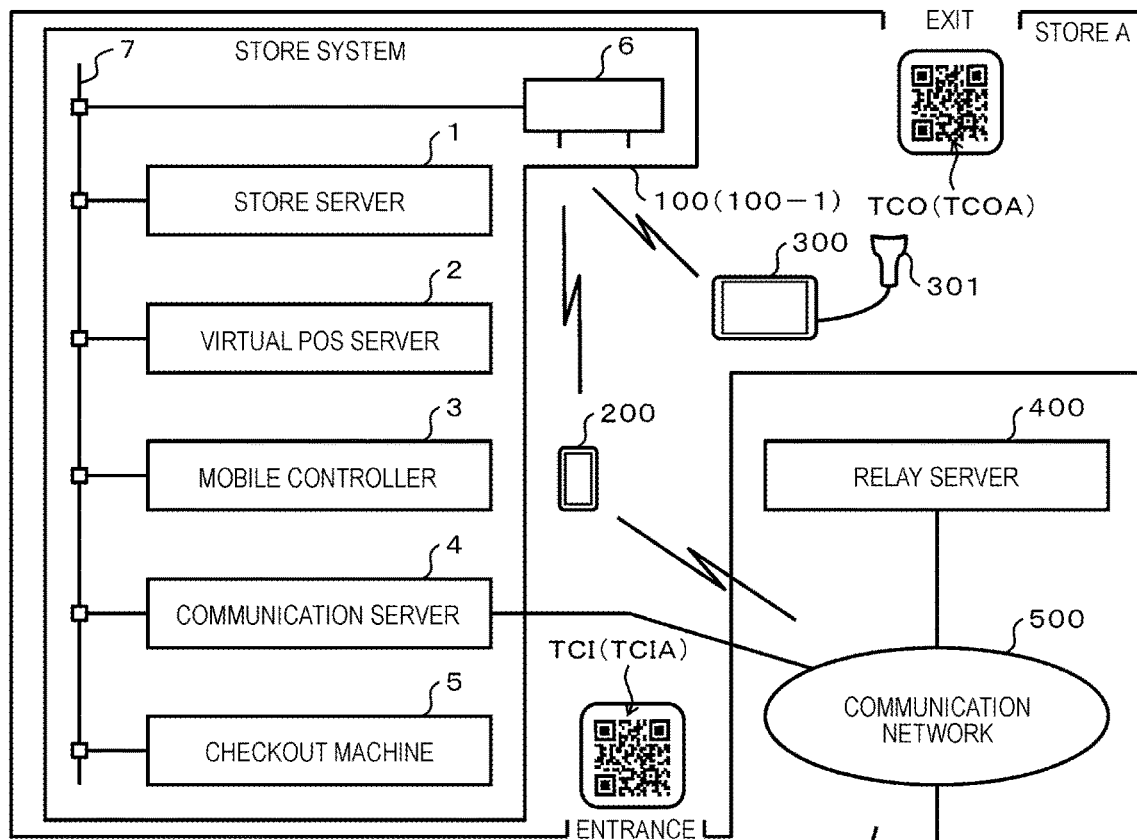
FIG. 1 is a block diagram illustrating a schematic configuration of a merchandise sales processing system according to an embodiment.
Figure 1:
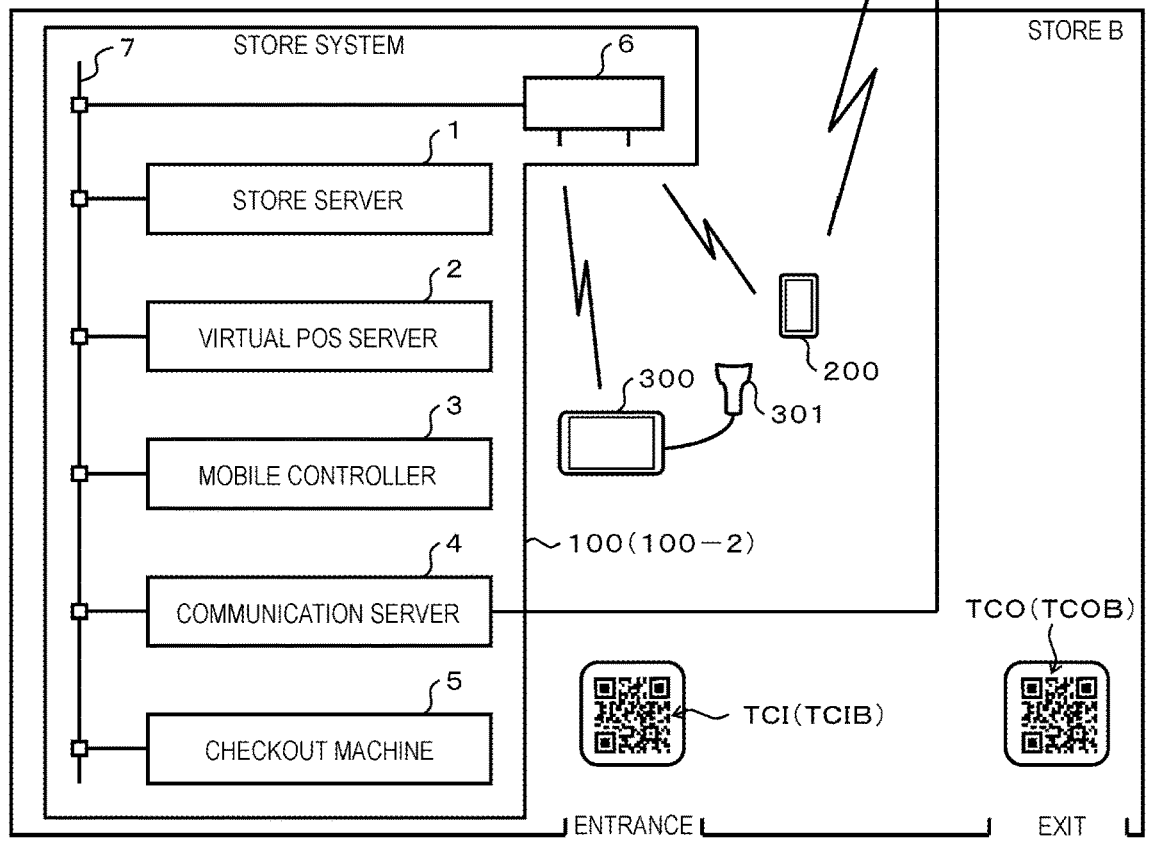

FIG. 1 is a block diagram illustrating a schematic configuration of a merchandise sales processing system according to the present embodiment.

The merchandise sales processing system includes a plurality of store systems 100, a user terminal 200, a cart terminal 300, and a relay server 400. Also, the plurality of store systems 100, the user terminal 200, the cart terminal 300, and the relay server 400 can communicate with each other via a communication network 500.

In FIG. 1, two store systems 100 are illustrated. These store systems 100 are respectively provided in a store A and a store B where the merchandise sales processing systems are used. There may be three or more stores where the merchandise sales processing system is used, and the store systems 100 are provided on a per store basis. Hereinafter, if it is required to distinguish the store system 100 provided in each store, the store system 100 provided in the store A is referred to as the store system 100-1, and the store system 100 provided in the store B is referred to as the store system 100-2.

A business operator who operates the store A may be the same as or different from the business operator who operates the store B. In addition, if the transaction system is used in the other stores, the business operator operates the stores may be the same as or different from the business operator who operates the store A or B.

The user terminal 200 and the cart terminal 300 are information processing devices that function as user interfaces for a customer who shops in a store by using the merchandise sales processing system. The user terminal 200 and the cart terminal 300 include a function of performing wireless communication with the store system 100 and a function of performing wireless communication with the communication network 500. As the user terminal 200, a communication terminal including a data communication function such as a smartphone or a tablet computer can be used. The user terminal 200 may be owned by the customer or may be lent to the customer by the store. As the cart terminal 300, a communication terminal including a data communication function such as a tablet computer may be used and attached to a shopping cart provided in the store A or B. The user terminal 200 and the cart terminal 300 are mainly operated by customers. However, the user terminal 200 and the cart terminal 300 may be operated by a clerk or the like on behalf of the customer. The cart terminal 300 includes a barcode scanner 301. The barcode scanner 301 is a reading device suitably configured to optically read a bar code indicating a merchandise code as an identifier for identifying a merchandise by using an infrared laser or the like. As the barcode scanner 301, may be provided with a reading device configured to recognize and read a barcode from an image captured by the image capturing device instead of or in addition to the reading device. The user terminal 200 and the cart terminal 300 are examples of portable terminals that can be moved in the store by customers.

The relay server 400 relays data communication between the store system 100 and the user terminal 200. For example, the relay server 400 provides a data communication relaying function as a cloud service via the communication network 500.

As the communication network 500, for example, the Internet, a virtual private network (VPN), a local area network (LAN), a public communication network, or a mobile communication network can be used by themselves or in combination as appropriate. As the communication network 500, a mobile communication network and the Internet or VPN are typically used.

A schematic configuration of each store system 100 is common. That is, the store system 100 communicably configures a store server 1, a virtual POS server 2, a mobile controller 3, a communication server 4, a checkout machine 5, and an access point 6 via an in-store communication network 7. However, as long as functions of the store server 1, the virtual POS server 2, the mobile controller 3, the communication server 4, the checkout machine 5, the access point 6, and the in-store communication network 7 for realizing operations described below are common, the functions do not have to be completely the same. In addition, some store systems 100 may include devices that are not illustrated in FIG. 1.

The store server 1 comprehensively manages a plurality of transactions to be the target of a transaction process realized by the store system 100 as described below. The store server 1 has, for example, the same function as a POS server in the related art.

The virtual POS server 2 performs an information process for registering merchandise to be purchased for each transaction and for settling prices of the merchandise to be purchased in response to the request from the outside. That is, the virtual POS server 2 virtually realizes the functions of the POS terminal in the related art. The information process performed by the virtual POS server 2 is customized to adapt the difference in the operation policy of each store.

That is, for example, the information process performed by the store server 1 in the store system 100-1 may be partially different from the information process performed by the store server 1 in the store system 100-2.

The mobile controller 3 supports the virtual POS server 2 to perform the above information process while using the user terminal 200 as the user interface device.

The communication server 4 performs a communication process in which the store server 1, the virtual POS server 2, the mobile controller 3, and the checkout machine 5 transmit data to and receive data from the relay server 400 and the like via the communication network 500.

The checkout machine 5 requests the price for the merchandise to be purchased for each transaction managed by the virtual POS server 2 and performs a process for causing the customer to settle the corresponding prices. The settlement method that the checkout machine 5 can use for the above settlement may be all or any part of the well-known settlement methods such as cash settlement, credit card settlement, electronic money settlement, point settlement, and code settlement. The code settlement is also referred to as the mobile settlement, the smartphone settlement, or the like. The checkout machine 5 may be operated by any one of the clerk or the customer. As the checkout machine 5, for example, a self-service-type checkout machine used in a semi-self-service-type POS system in the related art can be used. The checkout machine 5 may have a function of performing the information process for registering a merchandise as a merchandise to be purchased. In this case, as the checkout machine 5, for example, a face-to-face POS terminal used in a POS system in the related art or a self-service-type POS terminal used in the self-service-type POS system in the related art can be used.

The access point 6 performs a communication process for enabling the user terminal 200 to access the in-store communication network 7 by the wireless communication. As the access point 6, for example, a well-known communication device that performs the wireless communication by the IEEE802.11 standard can be used. The access point 6 is installed in a store so that the user terminal 200 can perform wireless communication from anywhere on the sales floor of the store. Depending on the scale of the store, the plurality of access points 6 may be disposed in one store system 100.

As the in-store communication network 7, the Internet, VPN, LAN, the public communication network, the mobile communication network, and the like can be used by themselves or in combination as appropriate. However, typically, the in-store communication network 7 is LAN.

In the store where the store system 100 is provided, a two-dimensional code TCI for check-in is posted near the entrance, and a two-dimensional code TCO for check-out is posted near the exit. The two-dimensional code TCI indicates check-in data for check-in. The two-dimensional code TCO indicates check-out data for check-out. The check-in data and the check-out data are different on a per store basis. Therefore, if it is required to distinguish between the two-dimensional codes TCI and TCO for the store A and the two-dimensional codes TCI and TCO for the store B, the two-dimensional codes for the store A are referred to as two-dimensional codes TCIA and TCOA, and the two-dimensional codes for the store B are referred to as two-dimensional codes TCIB and TCOB.

For example, the check-in data indicates information such as (1) an operation version of the store system 100, (2) a store code for identifying the store, (3) a name of a business operator who operates the store, (4) a name of the store provided with the store system 100, (5) a business operator code for identifying the business operator who operates the store, (6) a flag for distinguishing between the two-dimensional code TCI and the two-dimensional code TCO, and (7) a connection destination for communicating with the store system 100 by the user terminal 200 or information required for the connection, for each store. Examples of the connection destination for communicating with the store system 100 by the user terminal 200 include the access point 6 or the relay server 400. Examples of the information required for the connection include a service set identifier (SSID) for identifying a domain name of the relay server 400 or the access point 6, a password for accessing the access point 6 or the relay server 400, and the like. The check-in data may not include a part of the various kinds of exemplified information. The check-in data may indicate information different from the various kinds of exemplified information.

Figure 2:
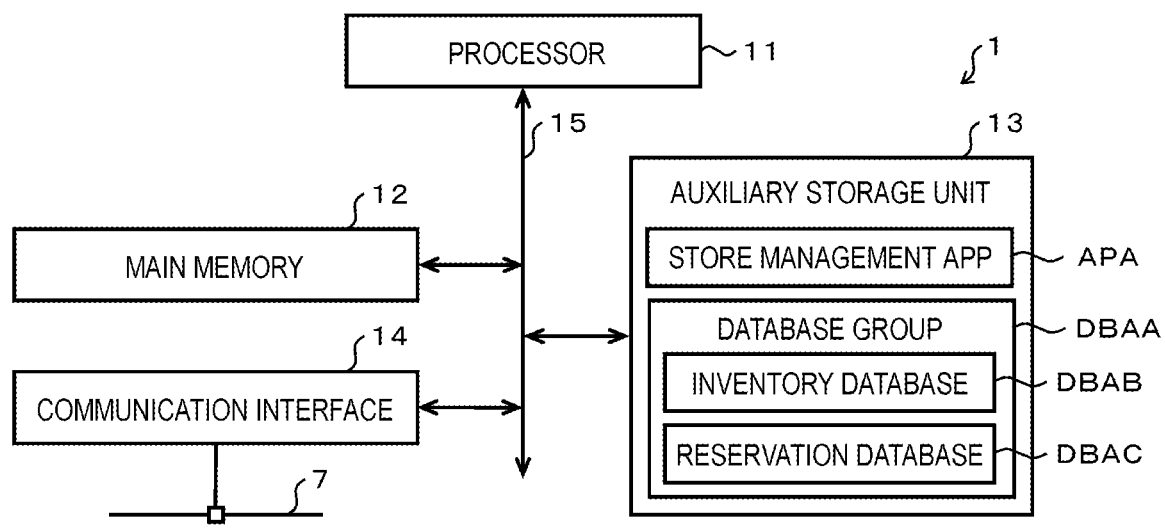
FIG. 2 is a block diagram illustrating a main circuit configuration of a store server illustrated in FIG. 1.

FIG. 2 is a block diagram illustrating a main circuit configuration of the store server 1. The store server 1 includes a processor 11, a main memory 12, an auxiliary storage unit 13, a communication interface 14, and a transmission line 15. The processor 11, the main memory 12, the auxiliary storage unit 13, and the communication interface 14 can communicate with each other via the transmission line 15. Also, the processor 11, the main memory 12, and the auxiliary storage unit 13 are connected to each other through the transmission line 15, to configure a computer for controlling the store server 1.

The processor 11 corresponds to a central portion of the computer. The processor 11 performs information processes for realizing various functions as the store server 1 according to an operating system and an information processing program such as an application program. The processor 11 is, for example, a central processing unit (CPU).

The main memory 12 corresponds to the main storage portion of the computer. The main memory 12 includes a non-volatile memory area and a volatile memory area. The main memory 12 stores the above information processing program in the non-volatile memory area. The main memory 12 may store data required for the processor 11 to perform the information process in the non-volatile or volatile memory area. The main memory 12 uses the volatile memory area as a work area in which data is appropriately rewritten by the processor 11. The non-volatile memory area is, for example, a read only memory (ROM). The volatile memory area is, for example, a random access memory (RAM).

The auxiliary storage unit 13 corresponds to an auxiliary storage portion of the computer. As the auxiliary storage unit 13, for example, a storage unit using well-known storage devices such as an electric erasable programmable read-only memory (EEPROM), a hard disc drive (HDD), or a solid state drive (SSD) can be used. The auxiliary storage unit 13 stores data used for performing various processes by the processor 11, data generated by a process in the processor 11, and the like. The auxiliary storage unit 13 may store the above information processing program.

The communication interface 14 performs data communication with each unit connected to the in-store communication network 7 according to a predetermined communication protocol. As the communication interface 14, for example, a well-known communication device for the LAN can be applied.

The transmission line 15 includes an address bus, a data bus, a control signal line, and the like, and transmits data and control signals to be transmitted and received to and from the connected each of the units.

The auxiliary storage unit 13 stores a store management app APA that is one of the information processing programs. The store management app APA is an application program, and information processes for realizing the functions as the store server 1 is described therein. The store management app APA may be generated separately according to a store operation policies per store or per business operator who operates the store. For example, if the sales data management method is different between the store A and the store B, in the store management app APA used in the store system 100-1, information processes for managing sales data adapted to the sales data management method in the store A are described, and in the store management app APA used in the store system 100-2, information processes for managing the sales data adapted to the sales data management method in the store B are described.

A part of the storage area of the auxiliary storage unit 13 is used as a database group DBAA. The database group DBAA includes a plurality of databases for managing various kinds of information. One of the databases included in the database group DBAA is a merchandise database for managing merchandise to be sold in the store. The merchandise database is a collection of data records correlated with merchandise to be managed. Data regarding the correlated merchandise such as merchandise codes, prices, and merchandise names is included in the data record of the merchandise database. The merchandise code is an identifier determined for identifying a merchandise on a per stock keeping unit (SKU) basis, and for example, a Japanese article number (JAN) code is used. The merchandise name is a name determined so that the merchandise is easily distinguished by a human. The price is an amount of money for the sale of a merchandise.

One of the databases included in the database group DBAA is a user database for managing users of the store. The user database is a collection of the data record correlated with the customer registered as the user. Data regarding the correlated customers such as user codes, attribute information for specifying the users is included in the data record of the user database. The user code is a unique identification code determined on a per customer basis in order to identify users individually. The attribute information can include names, genders, ages, addresses, telephone numbers, and the like. Settlement information declared by the users may be included in the data record of the user database. The settlement information is a credit number, a code settlement identifier (ID), or the like. If a plurality of settlement methods can be selected, a settlement method code for identifying the settlement method may be included in the settlement information. In the case of a store that provides a point service, an ID of the point service, the number of possessed points, and the like may be included in the settlement information.

One of the databases included in the database group DBAA is an inventory database DBAB. The inventory database DBAB describes inventory information indicating inventory statuses of the merchandise identified by the merchandise codes in the store in correlation with the respective merchandise codes of the merchandise sold in the store. The inventory information includes, for example, the number of inventories.

One of the databases included in the database group DBAA is a reservation database DBAC.

Figure 3:
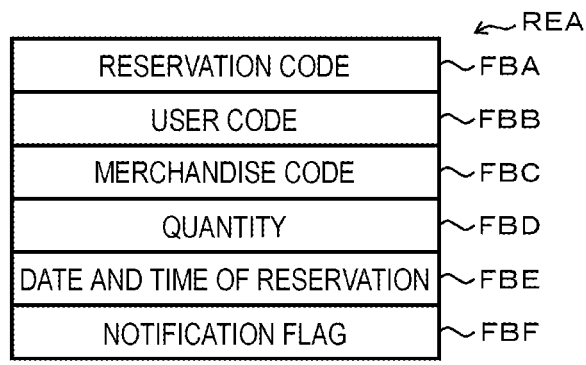
FIG. 3 is a schematic diagram illustrating a data structure of a data record included in a reservation database illustrated in FIG. 2.

FIG. 3 is a schematic diagram illustrating the data structure of a data record REA included in the reservation database DBAC. The reservation database DBAC is a collection of the data records REA for managing a reservation described below. The data records REA are correlated with respective merchandise to be reserved and include fields FBA, FBB, FBC, FBD, FBE, and FBF.

Reservation codes as the identifiers for managing the reservation regarding the correlated merchandise are set in the field FBA. User codes as the identifiers of the customers who reserve the correlated merchandise are set in the field FBB. Merchandise codes of the correlated merchandise are set in the field FBC. Quantities of the reservations of the correlated merchandise are set in the field FBD. Reservation dates indicating date and time of the reservation are set in the field FBE. Notification flags indicating whether the arrival notification is completed are set in the field FBF.

In addition, various databases that are managed by the POS server in the POS system in the related art are included in the database group DBAA. What kind of database the database group DBAA includes or what kind of data and what kind of structure the databases include may be determined on a per store basis.

Figure 4:
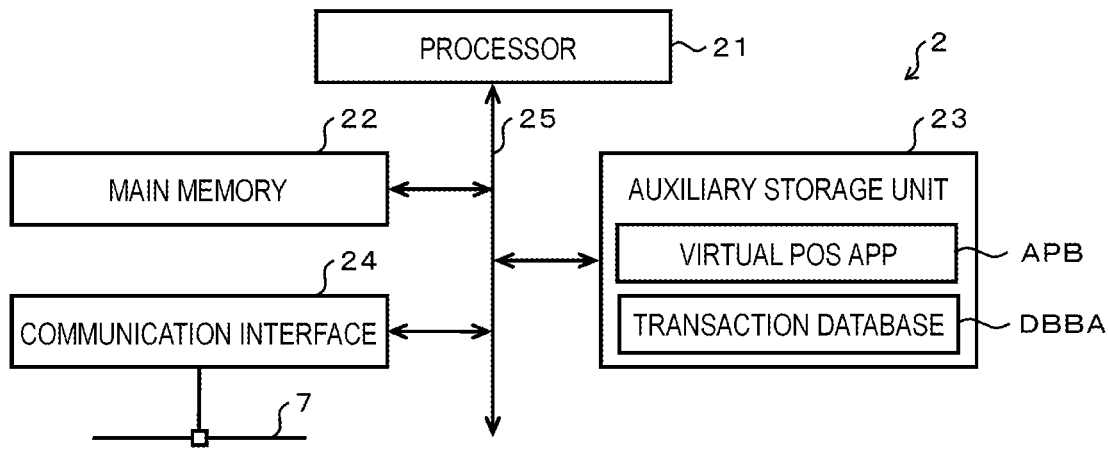
FIG. 4 is a block diagram illustrating a main circuit configuration of a virtual POS server illustrated in FIG. 1.

FIG. 4 is a block diagram illustrating a main circuit configuration of the virtual POS server 2. The virtual POS server 2 includes a processor 21, a main memory 22, an auxiliary storage unit 23, a communication interface 24, and a transmission line 25. The processor 21, the main memory 22, the auxiliary storage unit 23, and the communication interface 24 can communicate with each other via the transmission line 25. Also, the processor 21, the main memory 22, and the auxiliary storage unit 23 are connected to each other through the transmission line 25, to configure a computer for controlling the virtual POS server 2. Schematic functions of the processor 21, the main memory 22, the auxiliary storage unit 23, the communication interface 24, and the transmission line 25 are the same as those of the processor 11, the main memory 12, the auxiliary storage unit 13, the communication interface 14, and the transmission line 15, and thus the description thereof is omitted.

However, the auxiliary storage unit 23 stores a virtual POS app APB instead of the store management app APA. The virtual POS app APB is an application program, and an information process for realizing the function as the virtual POS server 2 is described therein. The virtual POS app APB may be generated separately according to store operation policies per store or per business operator who operates the stores. For example, if a discount service that is not provided in the store B is provided in the store A, information processes for realizing the corresponding discount service are described in the virtual POS app APB used in the store system 100-1, and the information process for realizing the corresponding discount service is not described in the virtual POS app APB used in the store system 100-2.

A part of the storage area of the auxiliary storage unit 23 is used as a transaction database DBBA and the reservation database DBAC instead of the database group DBAA.

Figure 5:
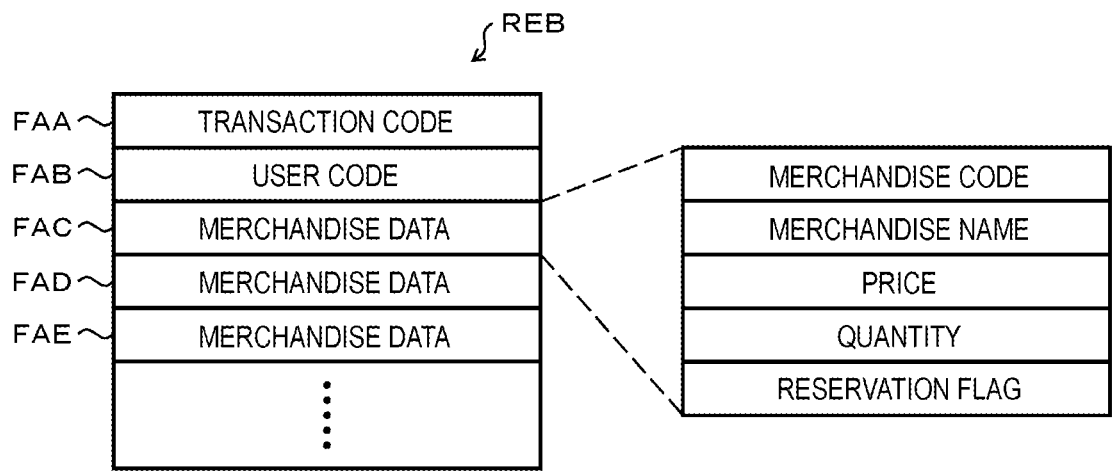
FIG. 5 is a schematic diagram illustrating a data structure of a data record included in a transaction database illustrated in FIG. 4.

FIG. 5 is a schematic diagram illustrating the data structure of a data record REB included in the transaction database DBBA. The transaction database DBBA is a collection of the data records REB correlated with the transactions with customers who are shopping around in the store. Also, the data record REB includes fields FAA and FAB. The data record REB can also include fields FAC, FAD, FAE, and the like.

A transaction code of the correlated transaction is set in the field FAA. A user code of the customer of the correlated transaction is set in the field FAB. If the registration of the merchandise to be purchased regarding the correlated transaction is completed in each field after the field FAC, merchandise data respectively regarding the registered merchandise to be purchased is set. The merchandise data includes merchandise codes, merchandise names, prices, quantities, reservation flags, and the like. The structure of the transaction database DBBA may be individually determined according to the store operation policies per store or per business operator who operates the store.

Figure 6:
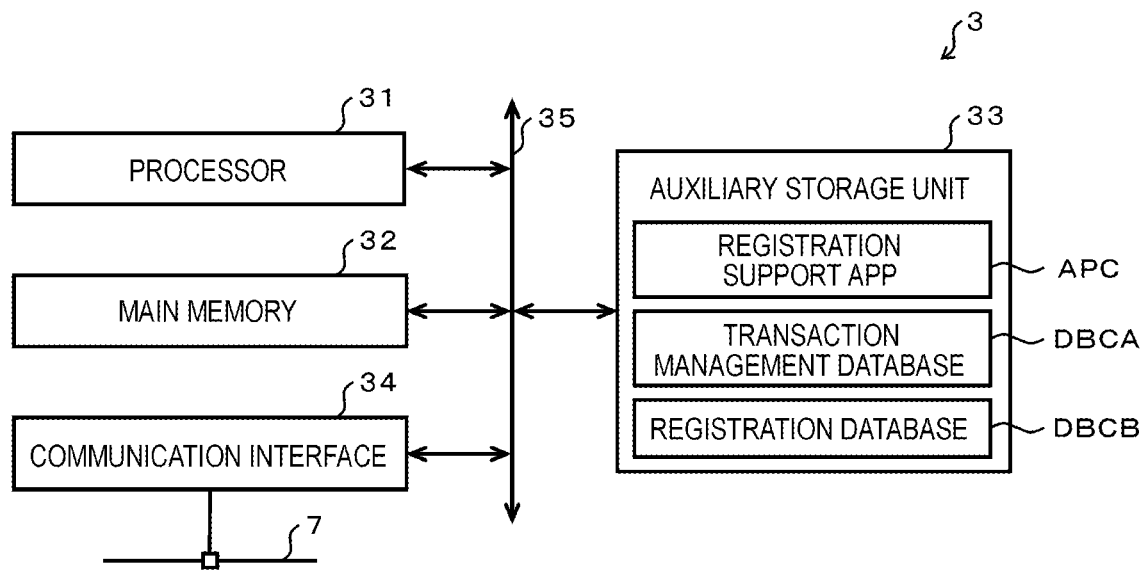
FIG. 6 is a block diagram illustrating a main circuit configuration of a mobile controller illustrated in FIG. 1.

FIG. 6 is a block diagram illustrating a main circuit configuration of the mobile controller 3. The mobile controller 3 includes a processor 31, a main memory 32, an auxiliary storage unit 33, a communication interface 34, and a transmission line 35. The processor 31, the main memory 32, the auxiliary storage unit 33, and the communication interface 34 can communicate with each other via the transmission line 35. Also, the processor 31, the main memory 32, and the auxiliary storage unit 33 are connected to each other through the transmission line 35, to configure a computer for controlling the mobile controller 3. The schematic functions of the processor 31, the main memory 32, the auxiliary storage unit 33, the communication interface 34, and the transmission line 35 are the same as those of the processor 11, the main memory 12, the auxiliary storage unit 13, the communication interface 14, and the transmission line 15, and thus the description thereof is omitted.

However, the auxiliary storage unit 33 stores a registration support app APC instead of the store management app APA. The registration support app APC is an application program, and an information process for supporting the registration of the merchandise to be purchased is described therein. The registration support app APC is common in each store system 100. However, various settings for the information process based on the registration support app APC may be customized on a per the store system 100 basis.

A part of the storage area of the auxiliary storage unit 23 is used as a transaction management database DBCA and a registration database DBCB instead of the database group DBAA. The structures of the transaction management database DBCA and the registration database DBCB are common in each store system 100.

The transaction management database DBCA is a collection of data records correlated with the user terminal 200 or the cart terminal 300 used by the customer in the store. Therefore, if one customer uses the user terminal 200 or the cart terminal 300 in the store, the transaction management database DBCA includes one data record. In addition, if no customer uses the user terminal 200 or the cart terminal 300 in the store, the transaction management database DBCA does not include a data record. Also, the data record of the transaction management database DBCA describes the terminal code, the user code, and the transaction code in correlation with each other.

The terminal code included in the data record of the transaction management database DBCA is an identifier for identifying the correlated user terminal 200 or the correlated cart terminal 300. As the terminal code, for example, unique identification codes that are set on a per communication terminal basis can be used in order to identify the respective communication terminals used as the user terminal 200 or the cart terminal 300. Otherwise, as the terminal code, for example, an identification code that is set with respect to the corresponding smartphone POS app if a smartphone POS app described below is installed in the user terminal 200, an identification code that is set with respect to the corresponding cart terminal app if the cart terminal app is installed in the cart terminal 300, or the like can be used. The user code included in the data record of the transaction management database DBCA is a user code that is allocated to the customer who uses the correlated user terminal 200 or the correlated cart terminal 300. The transaction code included in the data record of the transaction management database DBCA is an identifier for identifying the transaction performed by using the correlated user terminal 200 or the correlated cart terminal 300.

Figure 7:
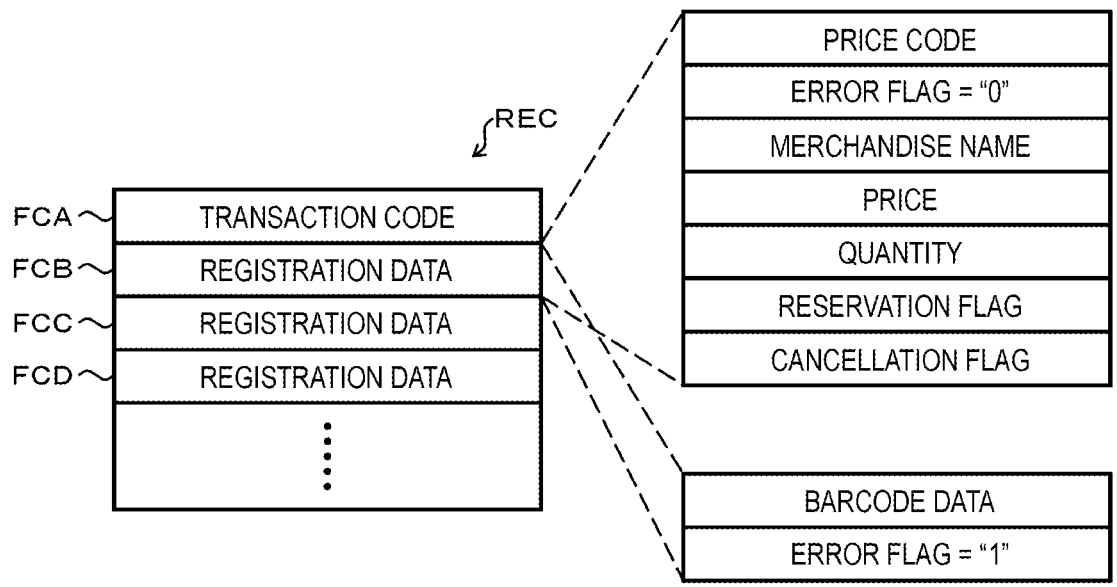
FIG. 7 is a schematic diagram illustrating a data structure of a data record included in a registration database illustrated in FIG. 6.

FIG. 7 is a schematic diagram illustrating a data structure of a data record REC included in the registration database DBCB. The registration database DBCB is a collection of the data records REC correlated with the transactions with the customers who are shopping around in the store. Also, the data record REC includes fields FCA and FCB. The data record REC can also include fields FCC and FCD, and the like.

A transaction code of the correlated transaction is set in the field FCA. The transaction code is the same as the transaction code included in the data record correlated with the user terminal 200 or the cart terminal 300 used in the correlated transaction in the transaction management database DBCA. The registration data regarding the merchandise tried registration for the correlated transaction is set in the field FCB. The registration data is described below.

If the registration of two or more merchandise to be purchased for the correlated transaction is tried, fields subsequent to the field FCC are included in the data record REC. Also, the same registration data as in the field FCB is set in the fields subsequent to the field FCC.

Figure 8:
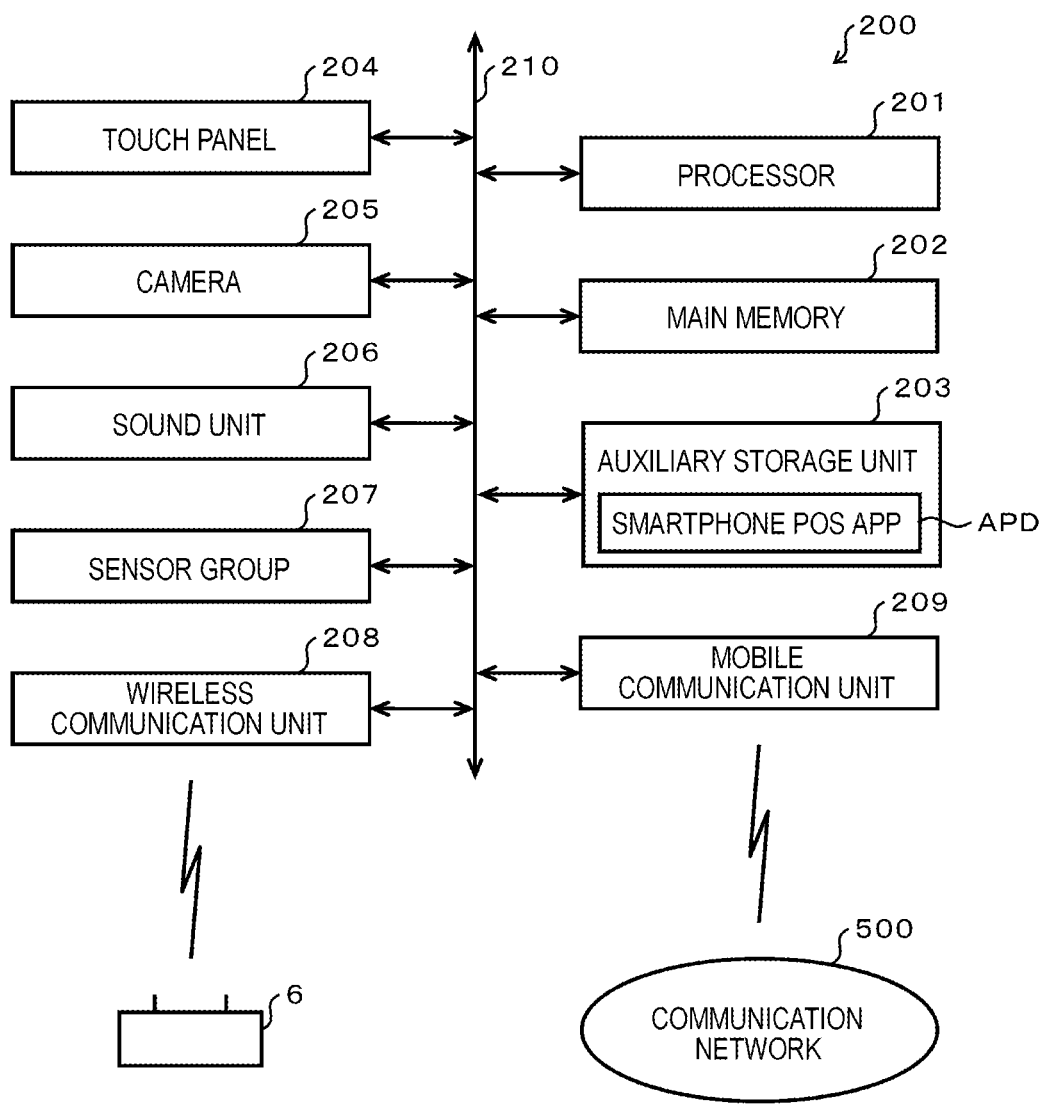
FIG. 8 is a block diagram illustrating a main circuit configuration of a user terminal illustrated in FIG. 1.

FIG. 8 is a block diagram illustrating a main circuit configuration of the user terminal 200. The user terminal 200 includes a processor 201, a main memory 202, an auxiliary storage unit 203, a touch panel 204, a camera 205, a sound unit 206, a sensor group 207, a wireless communication unit 208, a mobile communication unit 209, a transmission line 210, and the like. The processor 201 can communicate with the main memory 202, the auxiliary storage unit 203, the touch panel 204, the camera 205, the sound unit 206, the sensor group 207, the wireless communication unit 208, and the mobile communication unit 209 via the transmission line 210. Also, the processor 201, the main memory 202, and the auxiliary storage unit 203 are connected to each other through the transmission line 210, to configure a computer for controlling the user terminal 200. The schematic functions of the processor 201, the main memory 202, the auxiliary storage unit 203, and the transmission line 210 are the same as those of the processor 11, the main memory 12, the auxiliary storage unit 13, and the transmission line 15, and thus the description thereof is omitted.

The touch panel 204 functions as an input device and a display device of the user terminal 200. The camera 205 includes an optical system and an image sensor, and the image sensor generates image data that indicates an image in the field of view formed by the optical system. The sound unit 206 outputs various sounds such as voice and melody. The sensor group 207 includes various sensors such as an angular velocity sensor and a global positioning system (GPS) sensor.

The wireless communication unit 208 transmits and receives data to and from the access point 6 by wireless communication according to the wireless communication protocol. As the wireless communication unit 208, for example, a well-known communication device can be used in conformity to the IEEE 802.11 standard.

The mobile communication unit 209 is an interface of the data communication via the communication network 500. As the mobile communication unit 209, for example, a well-known communication device for performing data communication via a mobile communication network can be used.

The auxiliary storage unit 203 stores a smartphone POS app APD that is one of the information processing programs. The smartphone POS app APD is an application program, and information processes described below that cause the user terminal 200 to function as the user interface for customers of the store system 100 are described therein. The smartphone POS app APD is commonly used in the plurality of user terminals 200.

Figure 9:
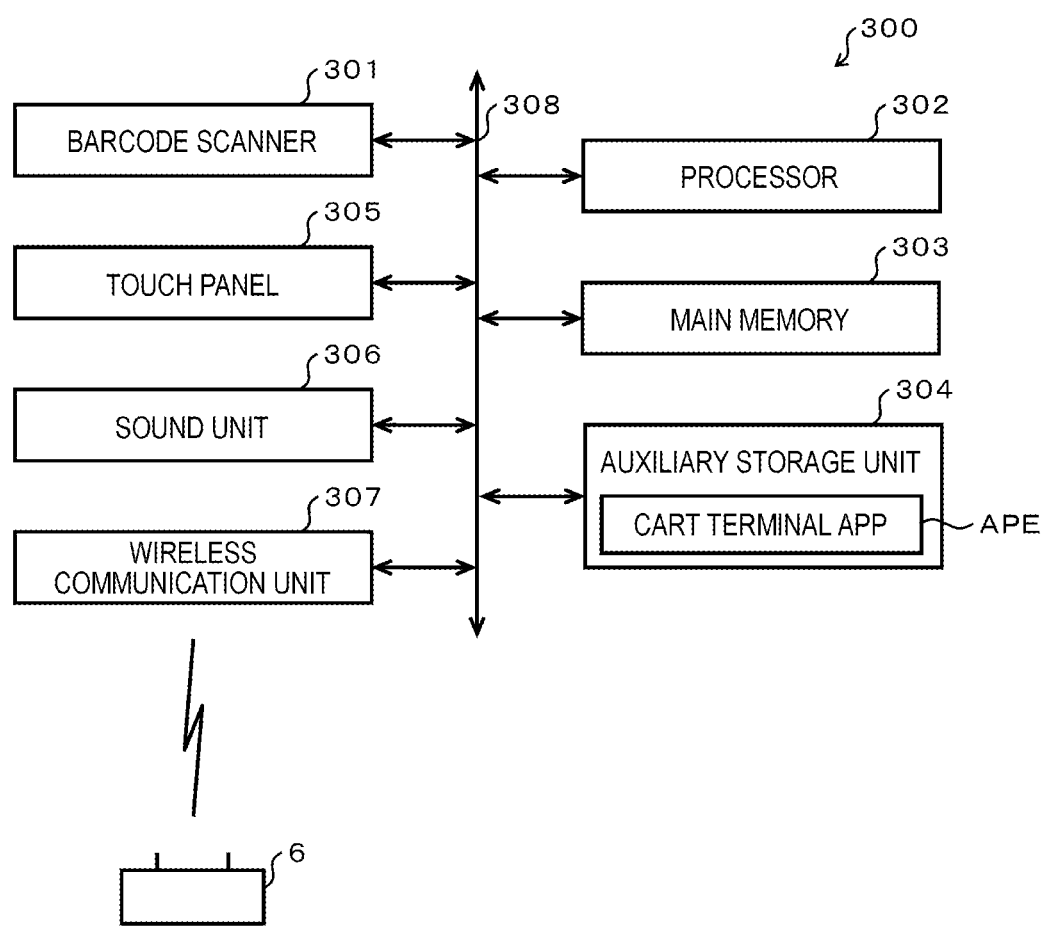
FIG. 9 is a block diagram illustrating a main circuit configuration of a cart terminal illustrated in FIG. 1.

FIG. 9 is a block diagram illustrating a main circuit configuration of the cart terminal 300. In addition to the barcode scanner 301, the cart terminal 300 includes a processor 302, a main memory 303, an auxiliary storage unit 304, a touch panel 305, a sound unit 306, a wireless communication unit 307, a transmission line 308, and the like. The processor 302 can communicate with the barcode scanner 301, the main memory 303, the auxiliary storage unit 304, the touch panel 305, the sound unit 306, and the wireless communication unit 307 via the transmission line 308. Also, the processor 302, the main memory 303, and the auxiliary storage unit 304 are connected to each other through the transmission line 308, to configure a computer for controlling the cart terminal 300. The schematic functions of the processor 302, the main memory 303, the auxiliary storage unit 304, the touch panel 305, the sound unit 306, the wireless communication unit 307, and the transmission line 308 are the same as those of the processor 11, the main memory 12, the auxiliary storage unit 13, the touch panel 204, the sound unit 206 and the wireless communication unit 208, and the transmission line 15, and thus the description thereof is omitted.

The auxiliary storage unit 304 stores a cart terminal app APE that is one of the information processing programs. The cart terminal app APE is an application program, and information processes for causing the cart terminal 300 to function as a user interface for customers of the store system 100 are described therein. The cart terminal app APE is commonly used in the cart terminals 300.

In the store server 1, the virtual POS server 2, the mobile controller 3, the user terminal 200, or the cart terminal 300, the store management app APA, the virtual POS app APB, the registration support app APC, the smartphone POS app APD, or the cart terminal app APE may be transferred in a state of being stored in the auxiliary storage unit 13, 23, 33, 203, and 304, and hardware in a state of not storing the store management app APA, the virtual POS app APB, the registration support app APC, the smartphone POS app APD, or the cart terminal app APE in the auxiliary storage unit 13, 23, 33, 203, and 304, and the store management app APA, the virtual POS app APB, the registration support app APC, the smartphone POS app APD, or the cart terminal app APE may be individually transferred. The store management app APA, the virtual POS app APB, the registration support app APC, the smartphone POS app APD, or the cart terminal app APE can be transferred by being recorded in a removable storage medium such as magnetic disks, magneto-optical disks, optical disks, and semiconductor memories or by communication via a network.

Subsequently, an operation of the merchandise sales processing system configured as above is described. Contents of the various processes described below are examples, and a change of an order of some processes, omission of some processes, or addition of other processes can be appropriately performed. In the following description, for example, for easier understanding of characteristic operations of the present embodiment, description of some processes is omitted. For example, if some errors occur, processes for dealing with the errors may be performed, but description of a part of such processes is omitted.

A service provided to the customer by the operation of the merchandise sales processing system described below is referred to as a smartphone POS service or a cart POS service, but in the following, the service is referred to as a smartphone POS service. Also, in the following, operations for realizing shopping using the user terminal 200 are mainly described.

The user terminal 200 transmits and receives data to and from the store system 100 in order to use the smartphone POS service, but whether to use the wireless communication with the access point 6 or the wireless communication with the communication network 500 for the data transmission and reception is determined by a state of a flag included in the check-in data. However, in the following, for the sake of simplification of the description, a case of using only wireless communication with the access point 6 is described. Whether to use a mode of requesting data transmission from the checkout machine 5 to the mobile controller 3 or a mode of data transmission from the mobile controller 3 to the checkout machine 5 without a request from the checkout machine 5 as the data transmission from the virtual POS server 2 to the checkout machine 5 in order to perform payment with the checkout machine 5 is determined by a state of a flag included in the check-in data. However, in the following, for the sake of simplification of the description, description is made with reference to a case where a mode of requesting data transmission from the checkout machine 5 to the mobile controller 3 is fixedly used.

In order to use a smartphone POS service, the customer can install the smartphone POS app APD on a smartphone owned by the customer to use the smartphone as the user terminal 200. Otherwise, the customer rents the user terminal 200 configured by installing the smartphone POS app APD in a tablet computer or the like from the store. Also, the customer possesses the user terminal 200 in a state in which the information process is started based on the smartphone POS app APD and enters any store in which the store system 100 is provided. Otherwise, after entering the store, the customer rents the shopping cart provided in the store and also the cart terminal 300 attached thereto.

The processor 201 of the user terminal 200 performs the information process based on the smartphone POS app APD. FIGS. 10, 11, 12, 13, and 14 illustrate flowcharts of information processes based on the smartphone POS app APD by the processor 201.

Figure 10:
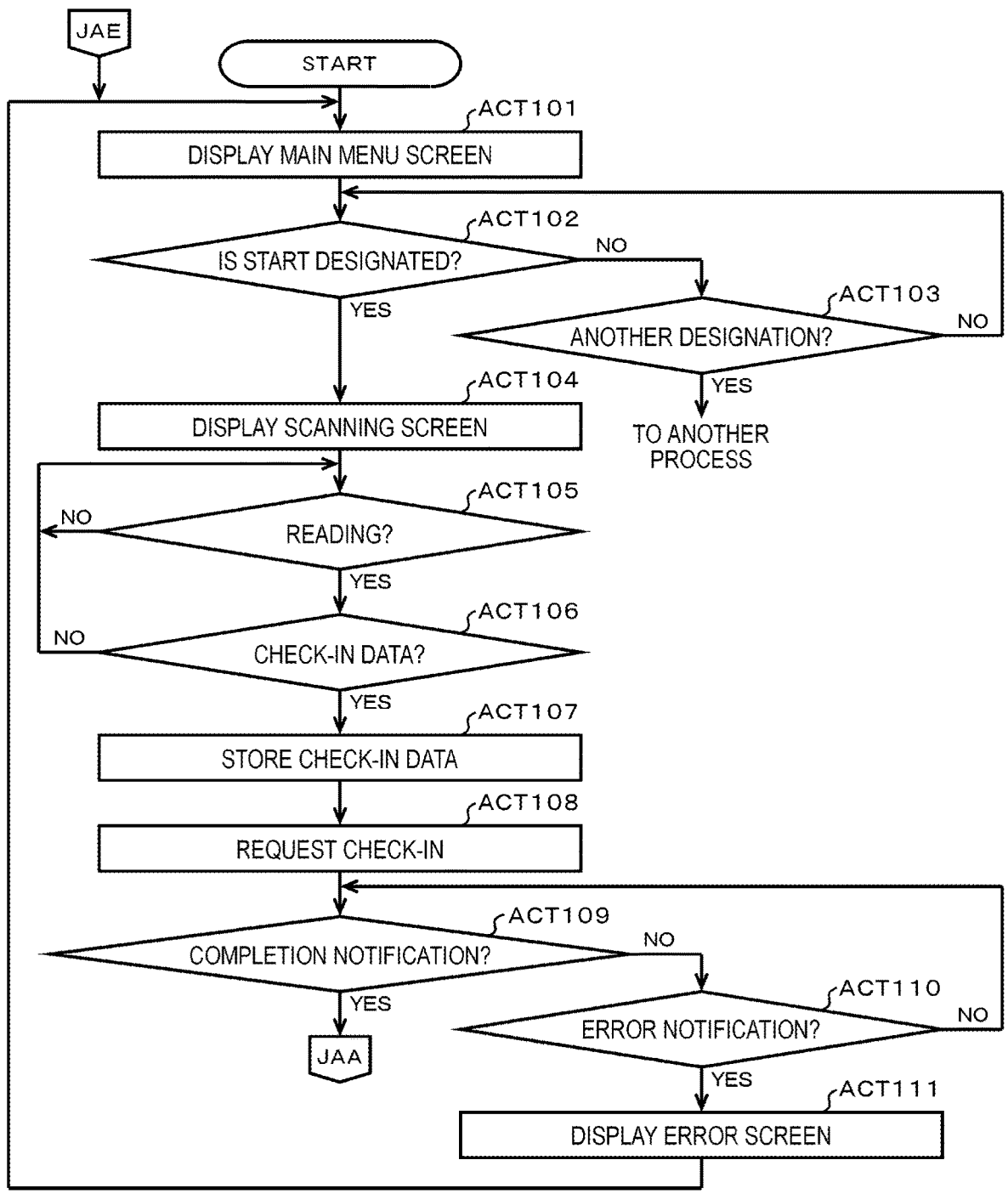
FIG. 10 is a flowchart of an information process by a processor illustrated in FIG. 8.

First, in ACT 101 illustrated in FIG. 10, the processor 201 displays a main menu screen on the touch panel 204. The main menu screen is a screen for receiving any designation of some processes to be performed based on the smartphone POS app APD. A plurality of graphical user interface (GUI) elements including a GUI element for designating a start of shopping are disposed on the main menu screen. The GUI elements are, for example, soft keys.

In ACT 102, the processor 201 confirms whether the start of the shopping is designated. Also, if the corresponding event cannot be confirmed, the processor 201 determines NO and proceeds to ACT 103.

In ACT 103, the processor 201 confirms whether the designation other than the start of the shopping is performed. Also, if the corresponding event cannot be confirmed, the processor 201 determines NO and returns to ACT 102.

In ACTS 102 and 103, the processor 201 waits for any designation on the main menu screen. If designation other than the start of the shopping is performed, the processor 201 determines YES in ACT 103 and proceeds to a designated process. The description of the processes of the processor 201 in this case is omitted.

If the customer enters the store and starts shopping, the customer performs a predetermined operation for designating the start of the shopping on the main menu screen. If an operation for designating the start of the shopping is detected, for example, on the touch panel 204, the processor 201 determines YES in ACT 102 and proceeds to ACT 104.

In ACT 104, the processor 201 displays a scanning screen for check-in on the touch panel 204. The scanning screen for check-in is a screen for prompting the customer to read the two-dimensional code TCI for the check-in. For example, the processor 201 starts the camera 205, and generates a scanning screen on which a character message prompting the customer to read the two-dimensional code TCI and a line indicating the reference of the position at which the two-dimensional code TCI is to be held are overlapped on the image obtained by the camera 205 accordingly.

If the scanning screen is displayed on the touch panel 204, the customer holds the camera 205 toward the two-dimensional code TCI so that the two-dimensional code TCI posted near the entrance of the store is reflected on the scanning screen.

In ACT 105, the processor 201 waits for the reading of the two-dimensional code. At this point, the processor 201 repeatedly analyzes the image obtained by the camera 205 and tries to read the two-dimensional code. The reading of the two-dimensional code may be performed as a process based on the smartphone POS app APD and or may be performed as a process based on another application program for reading the two-dimensional code. Also, if the two-dimensional code can be read, the processor 201 determines YES and proceeds to ACT 106.

In ACT 106, the processor 201 confirms whether the data indicated by the read two-dimensional code is the check-in data. Also, if there is no check-in data, the processor 201 determines NO and returns to ACT 105. At this point, the processor 201 may display the screen for notifying the customer that an erroneous two-dimensional code is read on the touch panel 204.

If it is confirmed that the data that is indicated by the read two-dimensional code is the check-in data, the processor 201 determines YES in ACT 106 and proceeds to ACT 107. In ACT 107, the processor 201 stores the read check-in data in the main memory 202 or the auxiliary storage unit 203.

In ACT 108, the processor 201 requests check-in from the mobile controller 3. Specifically, the processor 201 establishes wireless communication between the wireless communication unit 208 and the access point 6 based on the data indicated by the check-in data. For example, if the camera 205 is held toward the two-dimensional code TCIA by the customer in the store A, the processor 201 establishes the wireless communication with the access point 6 provided in the store system 100-1 based on the check-in data indicated by the two-dimensional code TCIA. The processor 201 transmits request data for requesting check-in to the mobile controller 3 via the wireless communication with the access point 6. As described above, if the wireless communication with the access point 6 provided in the store system 100-1 is established, the corresponding request data is transmitted to the mobile controller 3 provided in the store system 100-1 via the access point 6 and the in-store communication network 7 provided in the store system 100-1. The processor 201 includes identification data for identifying the check-in request and a terminal code of the own terminal in the request data for requesting check-in. If the customer is a registered user of the smartphone POS service and has a user code, the processor 201 also includes the user code in the request data. The user code is stored, for example, in the auxiliary storage unit 203 of the user terminal 200. The processor 201 may include the other data such as data for authenticating the customer in the request data.

As above, various requests from the user terminal 200 to the mobile controller 3 described below is realized by sending the request data including identification data for identifying the reason of the request from the user terminal 200 to the mobile controller 3 via the access point 6 and the in-store communication network 7.

If the request data for requesting the check-in is received by the communication interface 34, the processor 31 of the mobile controller 3 starts the information process relating to the transaction with the customer who tries to check in (hereinafter, referred to as a support process) according to the registration support app APC. FIGS. 15, 16, 17, and 18 are flowcharts of the support process by the processor 31.

Whenever the request data for requesting check-in is received by the communication interface 34, the processor 31 starts the corresponding support process. If the support process started based on another request is already performed, a new support process is started in parallel with the support process. That is, the processor 31 may perform a plurality of support processes in parallel using the plurality of user terminals 200 as targets, respectively. In the following, if "the user terminal 200" is simply used, the expression indicates the user terminal 200 to be a target of the support process in the description.

Figure 15:
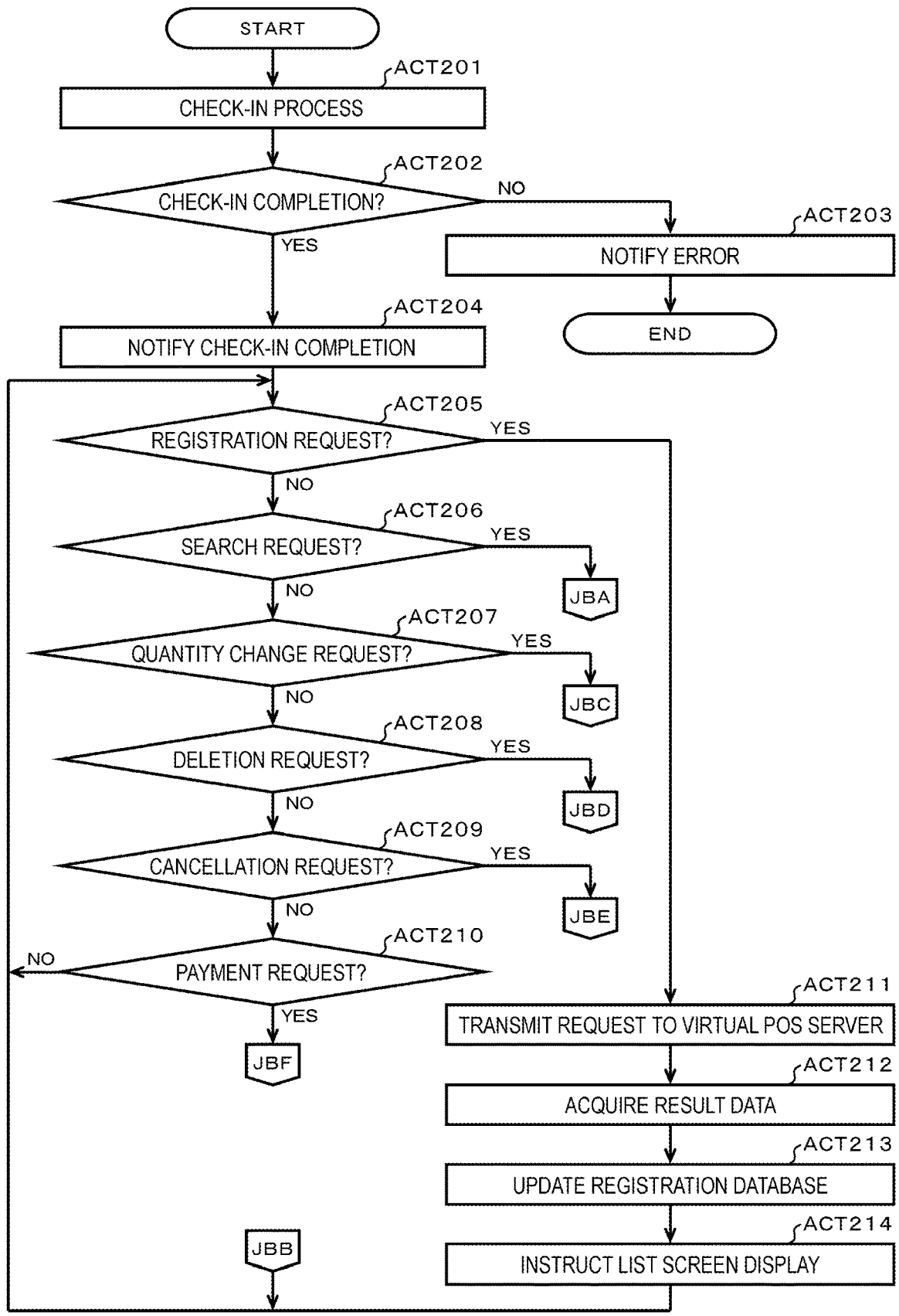
FIG. 15 is a flowchart of a transaction process by a processor illustrated in FIG. 6.

In ACT 201 of FIG. 15, the processor 31 performs the check-in process. For example, the processor 31 requests the start of the transaction from the virtual POS server 2 with the notification of the user code included in the request data, and receives the notification of the transaction code. Then, the processor 31 adds a new data record including the terminal code included in the request data to the transaction management database DBCA. The processor 31 includes a user code included in the request data to the new data record. The processor 31 includes the notified transaction code in the new data record. Accordingly, the management of the transaction performed by using the user terminal 200 that requests the check-in is started. The processor 31 may inquire the user code from the store server 1 and add the new data record to the transaction management database DBCA via the user authentication.

Then, the processor 31 identifies the customer identified by the user code included in the request data, as the customer who buys the merchandise to be purchased. That is, the processor 31 performs the information process based on the registration support app APC, and thus the computer that includes the processor 31 as the central portion functions as an identification unit.

Figure 19:
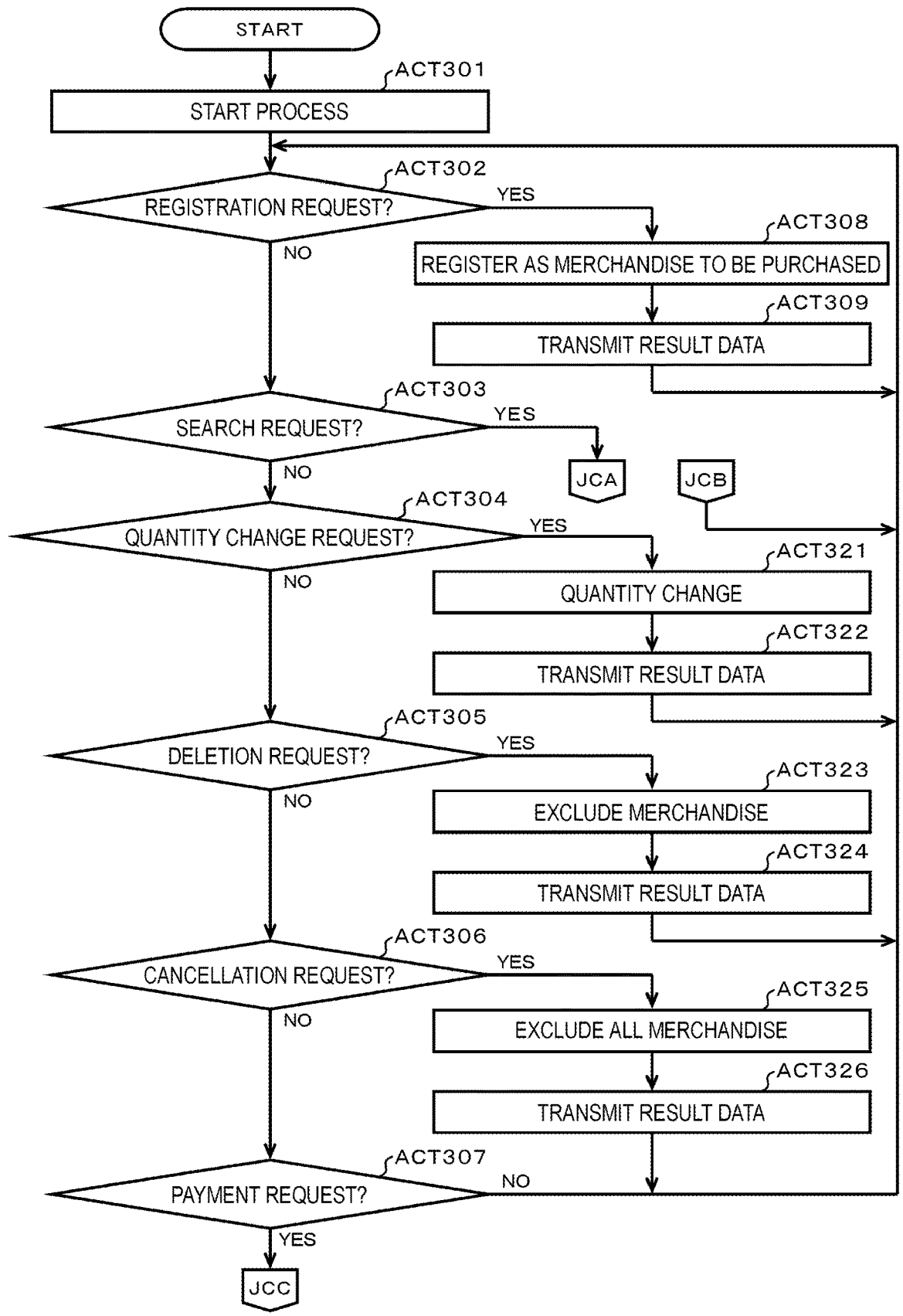
FIG. 19 is a flowchart of a transaction process by a processor illustrated in FIG. 4.
Figure 20:
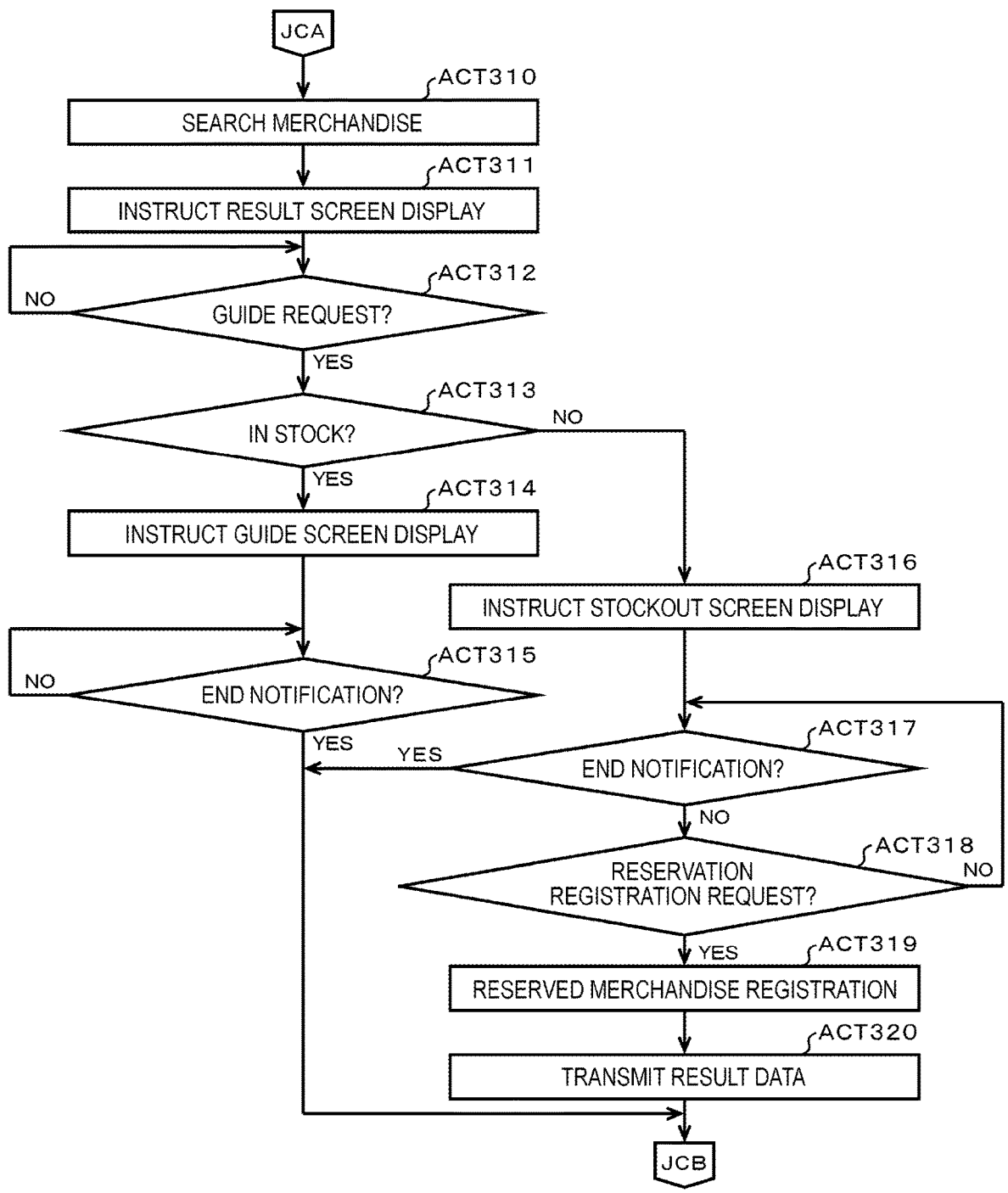
FIG. 20 is a flowchart of the transaction process by the processor illustrated in FIG. 4.
Figure 21:
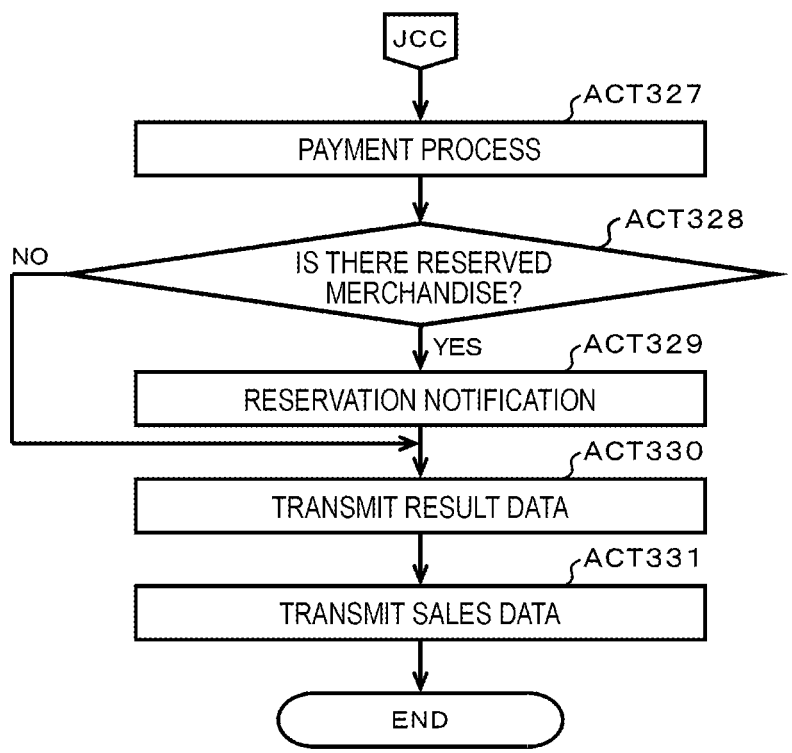
FIG. 21 is a flowchart of the transaction process by the processor illustrated in FIG. 4.

If the start of the transaction is requested from the mobile controller 3, the processor 21 of the virtual POS server 2 starts the information process relating to the corresponding transaction (hereinafter, referred to as a transaction process) according to the virtual POS app APB. FIGS. 19, 20, and 21 are flowcharts of the transaction process by the processor 21.

Whenever the start of the transaction is requested, the processor 21 starts the corresponding transaction process. If the transaction process that is started based on another request is already performed, a new transaction process is started in parallel with the transaction process. That is, the processor 21 may perform transaction processes with respect to the plurality of respective transactions in parallel. In the following, if "transaction" is simply used, the expression indicates the transaction to be the target of the transaction process in the description.

In ACT 301 in FIG. 19, the processor 21 performs the start process for starting the process relating to one transaction. According to a predetermined rule, for example, the processor 21 determines a new transaction code so as not to be overlapped with transaction codes for identifying other transactions, and notifies the mobile controller 3 of the determined transaction code. The processor 21 sets, for example, the transaction code determined as above in the field FAA and adds a new data record REB in which the user code included in the notification data is set in the field FAB to the transaction database DBBA.

The processor 31 of the mobile controller 3 performs the check-in process in ACT 201 in FIG. 15 as described above by using the transaction code notified from the virtual POS server 2 as above. Then, if the check-in process ends, the processor 31 proceeds to ACT 202.

In ACT 202, the processor 31 confirms whether the check-in process is normally completed. Also, if the check-in process cannot be normally completed due to some abnormality, the processor 31 determines NO and proceeds to ACT 203.

In ACT 203, the processor 31 notifies the user terminal 200 of an error. The processor 31 transmits, for example, the notification data for the error notification to the user terminal 200 via the in-store communication network 7 and the access point 6. The processor 31 includes the identification data for identifying the notification of the error in the notification data. The processor 31 may include an error code indicating the cause of the error in the notification data.

Various notifications from the mobile controller 3 to the user terminal 200 described hereinafter are realized by sending the notification data including the identification data for identifying the reason of the notification from the mobile controller 3 to the user terminal 200 via the in-store communication network 7 and the access point 6 as above. Also, the processor 31 ends the support process.

Meanwhile, if the check-in process can be normally completed, the processor 31 determines YES in ACT 202 and proceeds to ACT 204. In ACT 204, the processor 31 notifies the user terminal 200 of the check-in completion.

The processor 201 of the user terminal 200 requests the check-in in ACT 108 in FIG. 10 and proceeds to ACT 109. In ACT 109, the processor 201 confirms whether the check-in completion is notified. If the corresponding event cannot be confirmed, the processor 201 determines NO and proceeds to ACT 110. In ACT 110, the processor 201 confirms whether the check-in error is notified. Also, if the corresponding event cannot be confirmed, the processor 201 determines NO and returns to ACT 109. Then, in ACTS 109 and 110, the processor 201 waits for the notification of the check-in completion or the check-in error. Also, if notification data for the above error notification is received by the wireless communication unit 208, the processor 201 determines YES in ACT 110 and proceeds to ACT 111.

In ACT 111, the processor 201 displays the error screen on the touch panel 204. The error screen is a screen determined to report to the customer that the check-in cannot be performed. If the processor 201 is instructed to eliminate the display of the error screen, for example, by the operation of the GUI element or the like that is indicated in the error screen, the processor 201 returns to ACT 101.

Figure 11:
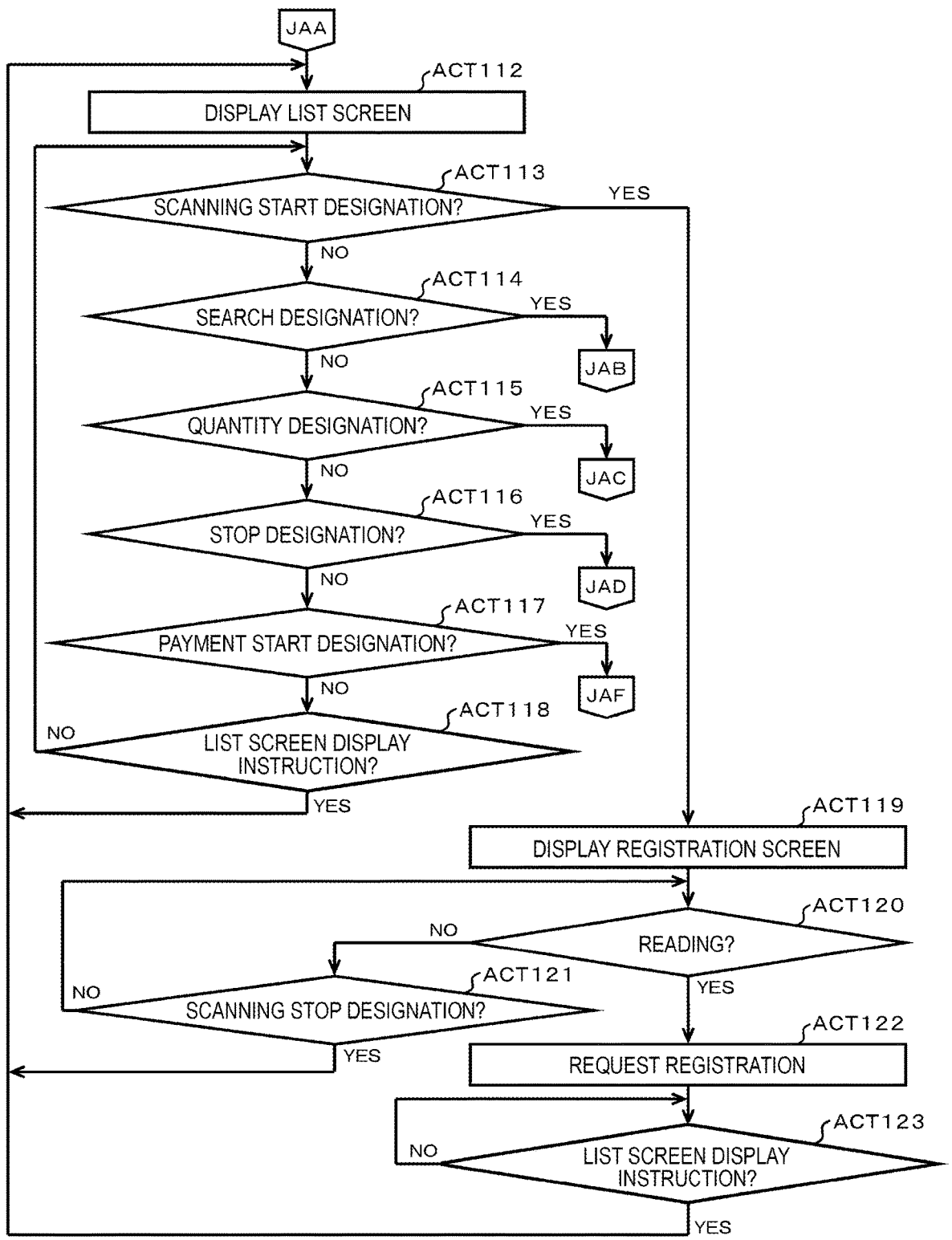
FIG. 11 is a flowchart of the information process by the processor illustrated in FIG. 8.

Meanwhile, if the notification data for notifying the above check-in completion is received by the wireless communication unit 208, the processor 201 determines YES in ACT 109 and proceeds to ACT 112 in FIG. 11. In ACT 112, the processor 201 displays the list screen on the touch panel 204. The list screen is a screen indicating the list of the registered merchandise to be purchased.

Figure 22:
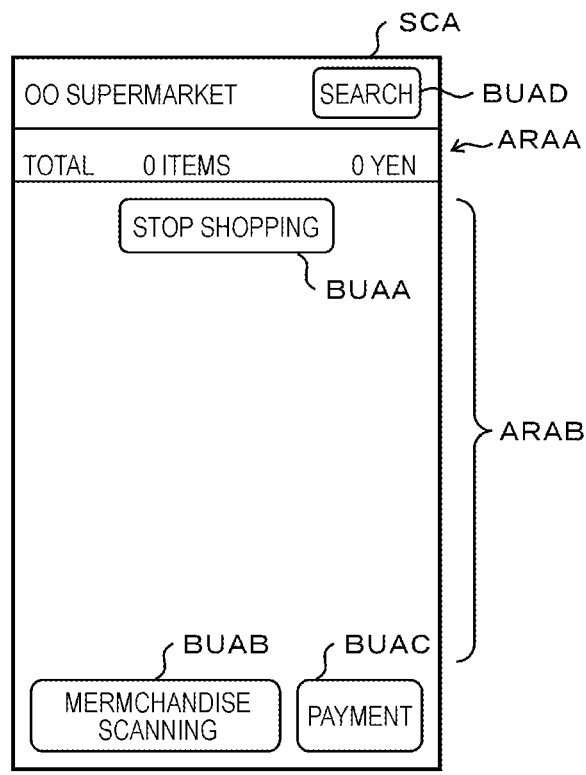
FIG. 22 is a diagram illustrating an example of a list screen in a state in which a merchandise to be purchased is not registered.

FIG. 22 is a diagram illustrating an example of a list screen SCA. The list screen SCA includes the display areas ARAA and ARAB and buttons BUAA, BUAB, BUAC, and BUAD. The display area ARAA indicates a total number of the merchandise to be purchased and a total amount of the prices of the merchandise to be purchased. The display area ARAB indicates the list of the merchandise to be purchased. The button BUAA is a soft key for enabling the customer to designate the cancellation of all merchandise to be purchased and stop the shopping. The button BUAB is a soft key for enabling the customer to designate a start of scanning a merchandise to be registered as a merchandise to be purchased. The button BUAC is a soft key for enabling the customer to designate a start of payment. The button BUAD is a soft key for enabling the customer to designate a start of a search described below. The list screen SCA illustrated in FIG. 22 indicates a state in which merchandise to be purchased are not registered. Therefore, both the total number and the total amount are shown as "0" in the display area ARAA, and none is shown in the display area ARAB.

In ACT 113 in FIG. 11, the processor 201 confirms whether the scanning start of the merchandise is designated. Also, if the corresponding event cannot be confirmed, the processor 201 determines NO and proceeds to ACT 114.

In ACT 114, the processor 201 confirms whether the start of the search is designated. Also, if the corresponding event cannot be confirmed, the processor 201 determines NO and proceeds to ACT 115.

In ACT 115, the processor 201 confirms whether the change of the quantity is designated. Also, if the corresponding event cannot be confirmed, the processor 201 determines NO and proceeds to ACT 116.

In ACT 116, the processor 201 confirms whether the stop of the shopping is designated. Also, if the corresponding event cannot be confirmed, the processor 201 determines NO and proceeds to ACT 117.

In ACT 117, the processor 201 confirms whether the start of the payment is designated. Also, if the corresponding event cannot be confirmed, the processor 201 determines NO and proceeds to ACT 118.

In ACT 118, the processor 201 confirms whether the display of the list screen is instructed. Also, if the corresponding event cannot be confirmed, the processor 201 determines NO and returns to ACT 113.

The processor 201 waits for the designation of any one of the scanning start, search start, quantity change, stop of the shopping, and payment start or the instruction of the display of the list screen in ACTS 113 to 118.

The processor 31 of the mobile controller 3 notifies the check-in completion in ACT 204 in FIG. 15, and then proceeds to ACT 205.

In ACT 205, the processor 31 confirms whether the registration is requested. Also, if the corresponding event cannot be confirmed, the processor 31 determines NO and proceeds to ACT 206.

In ACT 206, the processor 31 confirms whether the search is requested. Also, if the corresponding event cannot be confirmed, the processor 31 determines NO and proceeds to ACT 207.

In ACT 207, the processor 31 confirms whether the quantity change is requested. Also, if the corresponding event cannot be confirmed, the processor 31 determines NO and proceeds to ACT 208.

In ACT 208, the processor 31 confirms whether the deletion of the merchandise to be purchased is requested. Also, if the corresponding event cannot be confirmed, the processor 31 determines NO and proceeds to ACT 209.

In ACT 209, the processor 31 confirms whether the cancellation of the merchandise to be purchased is requested. Also, if the corresponding event cannot be confirmed, the processor 31 determines NO and proceeds to ACT 210.

In ACT 210, the processor 31 confirms whether the payment is requested. Also, if the corresponding event cannot be confirmed, the processor 31 determines NO and returns to ACT 205.

Then, the processor 31 waits for the request of any one of the registration, the search, the quantity change, the deletion, the cancellation, and the payment in ACTS 205 to 210.

If a merchandise is registered as a merchandise to be purchased, the customer designates a scanning start by a predetermined operation such as a touch on the button BUAB on the list screen SCA. In response to this, the processor 201 determines YES in ACT 113 in FIG. 11 and proceeds to ACT 119.

In ACT 119, the processor 201 displays the registration screen on the touch panel 204. The registration screen is a screen for prompting the customer to read a barcode indicating a merchandise code of a merchandise to be registered as a merchandise to be purchased.

Figure 23:
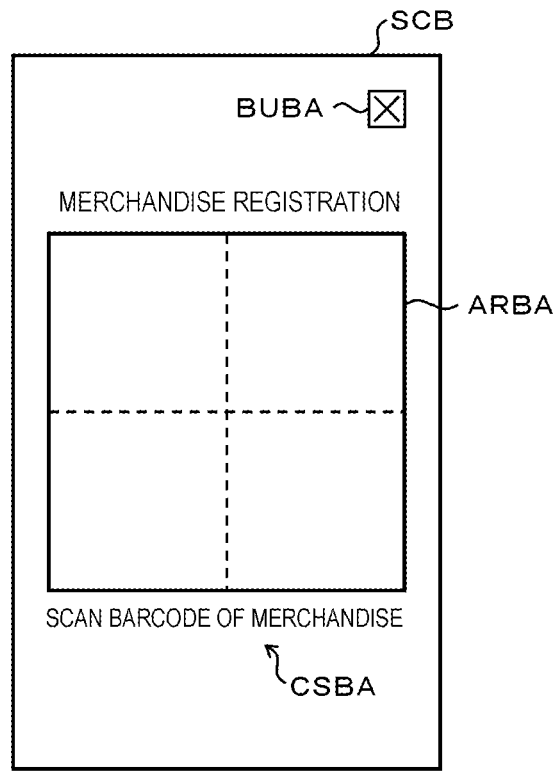
FIG. 23 is a diagram illustrating an example of a registration screen.

FIG. 23 is a diagram illustrating an example of a registration screen SCB. The registration screen SCB includes a display area ARBA, a character string CSBA, and a button BUBA. In the display area ARBA, an image obtained by the camera 205 is displayed. The character string CSBA shows a character message for prompting the customer to read the barcode of the merchandise. The button BUBA is a soft key for enabling the customer to designate the stop of the scanning of the merchandise code. For example, the processor 201 starts the camera 205, and generates the registration screen SCB on which a line indicating the range of the display area ARBA and an image indicating the character string CSBA and the button BUBA are overlapped on the image obtained by the camera 205 accordingly.

In ACT 120 in FIG. 11, the processor 201 confirms whether the barcode is read. At this point, the processor 201 analyzes an image obtained by the camera 205 and tries to read the barcode. The reading of the barcode may be performed as a process based on the smartphone POS app APD and may be performed as a process based on another application program for reading a barcode. Also, if the barcode is not read, the processor 201 determines NO and proceeds to ACT 121.

In ACT 121, the processor 201 confirms whether the stop of the scanning is designated. Also, if the corresponding event cannot be confirmed, the processor 201 determines NO and returns to ACT 120. Then, the processor 201 waits for the reading of the barcode or the designation of the stop of the scanning in ACTS 120 and 121.

If the customer desires to return to the display state of the list screen SCA without performing the scanning at this time, the customer designates the stop of the scanning by a predetermined operation such as a touch on the button BUBA. In response to this, the processor 201 determines YES in ACT 121 and returns to ACT 112. In this case, since the registration state of the merchandise to be purchased is not changed, the processor 201 again displays, on the touch panel 204, the list screen SCA in the same state as the screen displayed before the deletion screen is displayed.

If the registration screen SCB is displayed on the touch panel 204, the customer holds the camera 205 toward the merchandise so that a barcode displayed on the merchandise to be registered as the merchandise to be purchased is reflected in the display area ARBA. In response to this, the processor 201 determines YES in ACT 120 and proceeds to ACT 122.

In ACT 122, the processor 201 requests the registration from the mobile controller 3. The processor 201 includes data indicated by the read barcode (hereinafter, referred to as barcode data) in the request data to be transmitted here.

If the registration is requested from the user terminal 200 as described above, the processor 31 of the mobile controller 3 determines YES in ACT 205 in FIG. 15 and proceeds to ACT 211.

In ACT 211, the processor 31 transmits the request of the registration to the virtual POS server 2 with the notification of the transaction code. At this point, the processor 31 may add a transaction code to the request data sent from the user terminal 200 and transmit the transaction code to the virtual POS server 2 or may add the transaction code to the request data after the conversion by some processes and transmit the transaction code to the virtual POS server 2. However, the processor 31 notifies the barcode data included in the request data sent from the user terminal 200 to the virtual POS server 2.

The processor 21 of the virtual POS server 2 notifies the transaction code in ACT 301 in FIG. 19, and then proceeds to ACT 302.

In ACT 302, the processor 21 confirms whether the registration is requested. Also, if the corresponding event cannot be confirmed, the processor 21 determines NO and proceeds to ACT 303.

In ACT 303, the processor 21 confirms whether the search is requested. Also, if the corresponding event cannot be confirmed, the processor 31 determines NO and proceeds to ACT 304.

In ACT 304, the processor 21 confirms whether the quantity change is requested. Also, if the corresponding event cannot be confirmed, the processor 31 determines NO and proceeds to ACT 305.

In ACT 305, the processor 21 confirms whether the deletion of the merchandise to be purchased is requested. Also, if the corresponding event cannot be confirmed, the processor 31 determines NO and proceeds to ACT 306.

In ACT 306, the processor 21 confirms whether the cancellation of the merchandise to be purchased is requested. Also, if the corresponding event cannot be confirmed, the processor 31 determines NO and proceeds to ACT 307.

In ACT 307, the processor 21 confirms whether the payment is requested. Also, if the corresponding event cannot be confirmed, the processor 31 determines NO and returns to ACT 302.

Then, the processor 31 waits for the request of any one of the registration, the search, the quantity change, the deletion, the cancellation, and the payment in ACTS 302 to 307.

If the request of the registration is transmitted from the mobile controller 3 as described above, the processor 21 determines YES in ACT 302 and proceeds to ACT 308.

In ACT 308, the processor 21 tries to register the merchandise to be purchased based on the barcode data included in the request data transmitted from the mobile controller 3. That is, for example, the processor 21 adds a new field to the end of the data record REB in which the transaction code is set in the field FAA and adds new merchandise data. The processor 21 includes, for example, the merchandise code indicated by the barcode data, the merchandise name, the price, and the quantity "1" of the merchandise identified by the merchandise code in the new merchandise data to be added herein, and the reservation flag is set to a state not indicating a merchandise to be purchased by reservation (hereinafter, referred to as a reserved merchandise). For example, if the merchandise data including the merchandise code indicated by the barcode data is already included in the data record REB in which the transaction code is set in the field FAA, the processor 21 increases the quantity included in the merchandise data by 1. Here, according to some circumstances, the merchandise code indicated by the barcode data may not be registered in the merchandise database. In addition, a barcode different from the barcode indicating the merchandise code may be displayed on the merchandise. Also, in such a case, the processor 21 cannot register the merchandise to be purchased, and an error occurs.

As above, the processor 21 determines a merchandise based on the barcode data and registers the merchandise as the merchandise to be purchased. The data record REB generated by such registration indicates a list of the merchandise to be purchased. Then, the processor 21 performs the information process based on the virtual POS app APB so that the computer including the processor 21 as the central portion functions as a determination unit and a generation unit.

In ACT 309, the processor 21 transmits the result data indicating the result of the processes for the registration to the mobile controller 3. If the merchandise to be purchased can be correctly registered, the processor 21 includes identification data for identifying the notification of the regular registration, the merchandise code, the merchandise name, the price of the registered merchandise in the result data. If there is an error, the processor 21 includes identification data for identifying the notification of the error and the barcode data sent by the registration request in the result data. Then, the processor 21 returns to a standby state of ACTS 302 to 307.

After transmitting the registration request in ACT 211 in FIG. 15, the processor 31 of the mobile controller 3 proceeds to ACT 212.

In ACT 212, the processor 31 acquires the result data transmitted from the virtual POS server 2 as above. The processor 31 stores the acquired result data in the main memory 32 or the auxiliary storage unit 33.

In ACT 213, the processor 31 updates the registration database DBCB based on the result data. The registration database DBCB is updated, for example, as follows.

First case: a case of the notification of the regular registration where registration data including the notified merchandise code is not included in the data record REC correlated with the transaction to be processed.

In this case, the processor 31 adds a new field after the last field already existing in the data record REC correlated with the transaction to be processed and adds the new registration data to the corresponding field. The processor 31 includes a notified merchandise code, an error flag set as "0" indicating that there is no error, the notified merchandise name and price, the quantity set as "1", a reservation flag set as "0" indicating that the reservation is not made, and a cancellation flag set as "0" indicating that cancellation is not made, in the new registration data. The registration data added in this case becomes a structure illustrated on the upper right side of FIG. 7.

Second case: a case of the notification of the regular registration, where registration data including the notified merchandise code is included in the data record REC correlated with the transaction to be processed, but the cancellation flag of the corresponding registration data is "1" indicating that the cancellation is made.

In this case, the processor 31 processes in the same manner as in the first case.

Third case: a case of the notification of the regular registration where the registration data including the notified merchandise code is included in the data record REC correlated with the transaction to be processed, and the cancellation flag of the corresponding registration data is "0".

In this case, the processor 31 rewrites the value of the quantity included in the registration data which includes the notified merchandise code and in which the cancellation flag is set as "0" to a value one larger.

Fourth case: a case of the notification of error.

In this case, the processor 31 adds a new field after the last field already existing in the data record REC correlated with the transaction to be processed and adds the new registration data to the corresponding field. The processor 31 includes the notified barcode data and an error flag set as "1" indicating that there is an error, in the new registration data. Then, the registration data added in this case has a structure as illustrated on the lower right side of FIG. 7.

By being updated by the processor 31 in this manner, the registration database DBCB indicates the list of the merchandise to be purchased registered in the virtual POS server 2 and additionally records the barcode reading that is in error.

The processor 31 may store the barcode data sent by the registration request in the main memory 32 or the auxiliary storage unit 33, and includes the stored barcode data in the registration data in the fourth case. In this case, the processor 21 of the virtual POS server 2 may not include the barcode data in the result data. The processor 31 extracts the merchandise code from the stored barcode data and performs the processes in the first to third cases based on the merchandise code. The merchandise name and the price may be acquired by the processor 31 from the store server 1 and the like based on the merchandise code.

In ACT 214, the processor 31 instructs the user terminal 200 to display the list screen. For example, the processor 31 transmits the instruction data including the identification data for identifying the display instruction of the list screen to the user terminal 200 via the in-store communication network 7 and the access point 6. The processor 31 includes the merchandise code, the merchandise name, the price, and the quantity included in the data record REC correlated with the transaction to be processed in the registration database DBCB, in the instruction data. The processor 31 then returns to the standby state of ACTS 205 to 210.

Various instructions from the mobile controller 3 to the user terminal 200 described hereinafter is realized by sending the instruction data including the identification data for identifying the reason of the instruction from the mobile controller 3 to the user terminal 200 via the in-store communication network 7 and the access point 6 as above.

The processor 201 of the user terminal 200 requests the registration in ACT 122 in FIG. 11, and then proceeds to ACT 123. In ACT 123, the processor 201 waits for the instruction of the display of the list screen. Also, if the display of the list screen is instructed from the mobile controller 3 as described above, the processor 201 determines YES, returns to ACT 112, and displays the list screen SCA on the touch panel 204, again. The processor 201 at this point sets the list screen SCA as the screen showing the merchandise name, the price, and the quantity of the merchandise to be purchased included in the instruction data.

Therefore, the customer can register merchandise as the merchandise to be purchased by repeating the scanning start designation and causing the user terminal 200 to sequentially read the barcodes of the merchandise to be registered.

Figure 24:
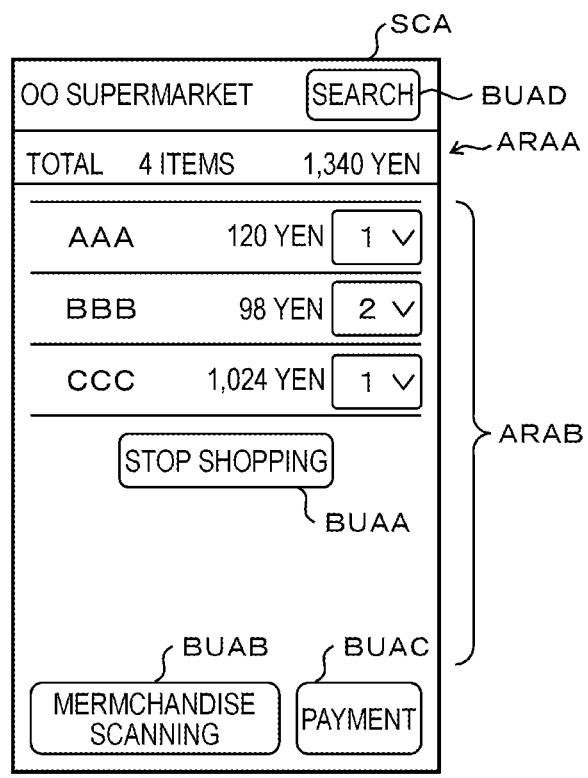
FIG. 24 is a diagram illustrating an example of a list screen in a state in which the registration of the merchandise to be purchased is completed.

FIG. 24 is a diagram illustrating an example of the list screen SCA in a state in which the merchandise to be purchased are registered. The list screen SCA illustrated in FIG. 24 is an example in which one merchandise having the merchandise name of "AAA" and the price of 120 yen, two merchandise having the merchandise name of "BBB" and the price of 98 yen, and one merchandise having the merchandise name of "CCC" and the price of 1,024 yen are registered as the merchandise to be purchased. The list screen SCA illustrated in FIG. 24 indicates the merchandise name, the price, and the quantity relating to the registered merchandise in the display area ARAB. In the display area ARAA, "4" is indicated as the total number, and "1,340" is indicated as the total amount.

If the customer cannot find a merchandise the customer wants to purchase and if the customer wants to receive a guide with respect to the corresponding merchandise, the customer designates the start of the search by a predetermined operation such as a touch on the button BUAD on the list screen.

Figure 12:
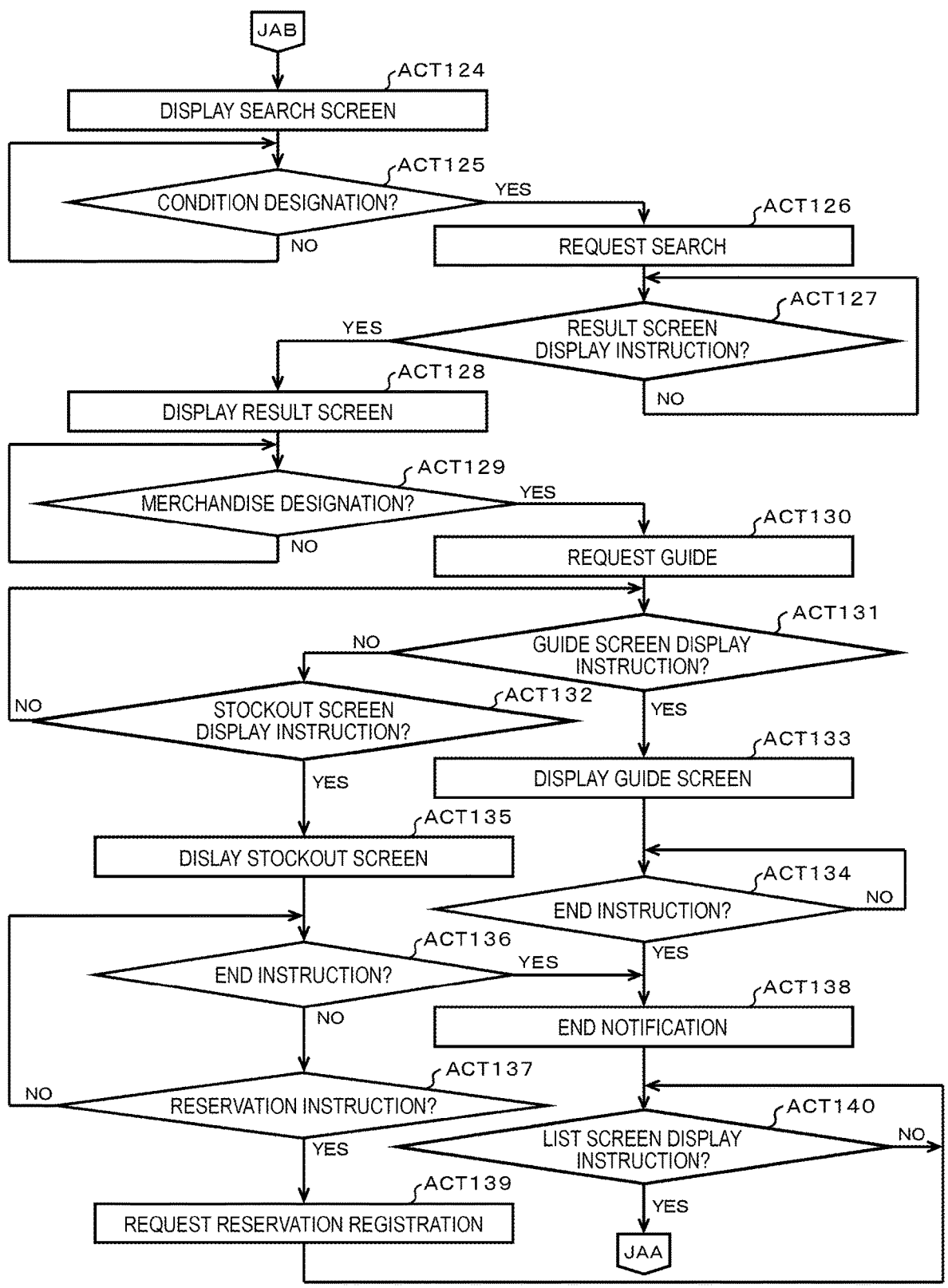
FIG. 12 is a flowchart of the information process by the processor illustrated in FIG. 8.

If the start of the search is designated, the processor 201 of the user terminal 200 determines YES in ACT 114 in FIG. 11 and proceeds to ACT 124 in FIG. 12.

In ACT 124, the processor 201 displays a search screen on the touch panel 204.

The search screen is a GUI screen for enabling the customer to designate a condition for merchandise search such as a merchandise name.

In ACT 125, the processor 201 waits for the designation of the condition of the search. Then, if the customer designates the condition of the search on the search screen, the processor 201 determines YES and proceeds to ACT 126.

In ACT 126, the processor 201 requests the search from the mobile controller 3. The processor 201 includes the condition data indicating the designated condition in the request data to be transmitted here.

Figure 16:
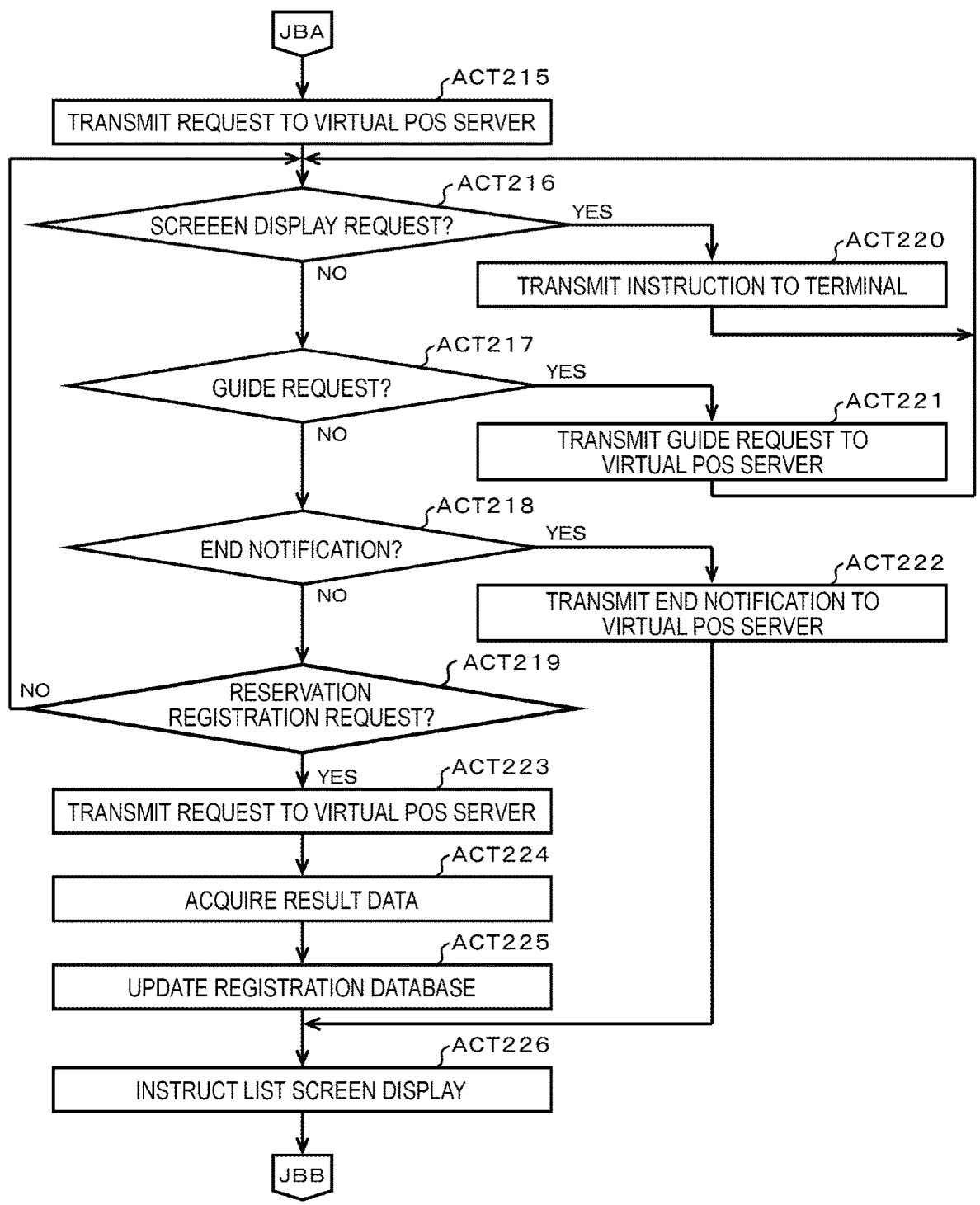
FIG. 16 is a flowchart of the transaction process by the processor illustrated in FIG. 6.

If the search is requested from the user terminal 200 as described above, the processor 31 of the mobile controller 3 determines YES in ACT 206 in FIG. 15 and proceeds to ACT 215 in FIG. 16.

In ACT 215, the processor 31 transmits the request of the search to the virtual POS server 2. At this point, the processor 31 may transmit the request data sent from the user terminal 200 to the virtual POS server 2 as it is, and may transmit request data after conversion by some processes to the virtual POS server 2. Here, the processor 31 notifies the condition data included in the request data sent from the user terminal 200 to the virtual POS server 2.

If the request of the search is transmitted from the mobile controller 3 as described above, the processor 21 of the virtual POS server 2 determines YES in ACT 303 in FIG. 19 and proceeds to ACT 310 in FIG. 20.

In ACT 310, the processor 21 searches the merchandise database included in the database group DBAA for the merchandise that matches the condition indicated by the condition data included in the request data.

In ACT 311, the processor 21 instructs the mobile controller 3 to display the result screen. The processor 21 transmits, for example, the instruction data including the identification data for identifying the display instruction of the result screen to the user terminal 200 via the in-store communication network 7 and the access point 6. The processor 21 generates the result screen indicating the result of the search in ACT 310 and includes the screen data indicating the result screen in the instruction data. The content of the result screen may be appropriately determined, for example, by a developer of the virtual POS app APB or a manager of the virtual POS server 2. It is assumed that the result screen is set to the screen indicating the list of the merchandise found by the search.

The processor 31 of the mobile controller 3 transmits the search request in ACT 215 in FIG. 16, and then proceeds to ACT 216.

In ACT 216, the processor 31 confirms whether the screen display is requested. Also, if the corresponding event cannot be confirmed, the processor 31 determines NO and proceeds to ACT 217.

In ACT 217, the processor 31 confirms whether the guide is requested. Also, if the corresponding event cannot be confirmed, the processor 31 determines NO and proceeds to ACT 218.

In ACT 218, the processor 31 confirms whether the end of the search is notified. Also, if the corresponding event cannot be confirmed, the processor 31 determines NO and proceeds to ACT 219.

In ACT 219, the processor 31 confirms whether the reservation registration is requested. Also, if the corresponding event cannot be confirmed, the processor 31 determines NO and returns to ACT 216.

Then, the processor 31 waits for any one of the instruction of the screen display, notification of the end of the search, and the reservation registration in ACTS 216 to 219. Then, if the display of the result screen is requested, the processor 31 determines YES in ACT 216 as described above and proceeds to ACT 220.

In ACT 220, the processor 31 transmits the display instruction of the result screen, to the user terminal 200 used for the transaction identified by the transaction code included in the instruction data. The processor 31 finds the data record including the transaction code included in the instruction data from the transaction management database DBCA and transmits the instruction data to the user terminal 200 identified by the terminal code included in the corresponding data record. At this point, the processor 31 may transmit the instruction data sent from the virtual POS server 2 to the user terminal 200 as it is and may transmit the instruction data after conversion by some processes to the user terminal 200. Here, the processor 31 sends the screen data included in the instruction data sent from the virtual POS server 2 to the user terminal 200. The processor 31 then returns to the standby state of ACTS 216 to 219.

In the user terminal 200, the processor 201 requests the search in ACT 126 in FIG. 12, and then proceeds to ACT 127.

In ACT 127, the processor 201 waits for the display instruction of the result screen. Also, if the display instruction of the result screen is transmitted from the mobile controller 3 as described above, the processor 201 determines YES and proceeds to ACT 128.

In ACT 128, the processor 201 displays the result screen indicating the screen data included in the instruction data on the touch panel 204.

In ACT 129, the processor 201 waits for the designation of the merchandise.

If a desired merchandise is included in the list of the merchandise represented in the result screen displayed on the touch panel 204, the customer designates the corresponding merchandise, for example, by a predetermined operation on the touch panel 204. Then, if the merchandise is designated in this manner, the processor 201 determines YES in ACT 129 and proceeds to ACT 130.

In ACT 130, the processor 201 requests the guide relating to the designated merchandise to the mobile controller 3. The processor 201 includes the merchandise code of the designated merchandise in the request data to be transmitted here.

If the guide is requested from the user terminal 200 as described above, the processor 31 of the mobile controller 3 determines YES in ACT 217 in FIG. 16 and proceeds to ACT 221.

In ACT 221, the processor 31 transmits the request of the guide to the virtual POS server 2. That is, the processor 31 transmits the request data sent from the user terminal 200 to the virtual POS server 2, for example, in order to request the guide. Also, the processor 31 then returns to the standby state of ACTS 216 to 219.

If the display of the result screen is instructed in ACT 311 in FIG. 20, the processor 21 of the virtual POS server 2 proceeds to ACT 312.

In ACT 312, the processor 21 waits for the request of the guide. Also, if the request of the guide is transmitted from the mobile controller 3 as above, the processor 21 determines YES and proceeds to ACT 313.

In ACT 313, the processor 21 confirms whether the merchandise identified by the merchandise code included in the request data for requesting the guide is in stock. The processor 21 acquires, for example, the inventory information described in the inventory database DBAB in correlation with the merchandise code from the store server 1 and determines whether the merchandise is in stock based on the inventory information. Also, if the corresponding merchandise is in stock, the processor 21 determines YES and proceeds to ACT 314.

In ACT 314, the processor 21 instructs the mobile controller 3 to display the guidance screen. The processor 21 transmits, for example, the instruction data including the identification data for identifying the display instruction of the guidance screen to the user terminal 200 via the in-store communication network 7 and the access point 6. The processor 21 generates a guidance screen as a screen for letting the customer know the display location of the merchandise designated as the target of the guide and includes the screen data indicating the guidance screen in the instruction data. The content of the guidance screen may be appropriately determined, for example, by the developer of the virtual POS app APB, the manager of the virtual POS server 2, or the like. It is assumed that the guidance screen is a screen indicating an in-store map indicating the display location.

Meanwhile, if the corresponding merchandise is not in stock, the processor 21 determines NO in ACT 313 and proceeds to ACT 316.

In ACT 316, the processor 21 instructs the mobile controller 3 to display the stockout screen. The processor 21 transmits, for example, the instruction data including the identification data for identifying the display instruction of the stockout screen to the mobile controller 3 via the in-store communication network 7. The processor 21 generates the stockout screen as a screen for letting the customer know that the merchandise designated as the target of the guide is out of stock and includes the screen data indicating the stockout screen in the instruction data. The content of the stockout screen may be appropriately determined, for example, by the developer of the virtual POS app APB, the manager of the virtual POS server 2, or the like.

If the guidance screen or the display of the stockout screen is requested as described above, the processor 31 of the mobile controller 3 determines YES in ACT 216 in FIG. 16 and proceeds to ACT 220.

In ACT 220, the processor 31 transmits the display instruction of the guidance screen or the stockout screen to the user terminal 200 used for the transaction identified by the transaction code included in the instruction data. Also, the processor 31 then returns to the standby state of ACTS 216 to 219.

In the user terminal 200, the processor 201 requests the guide in ACT 130 in FIG. 12, and then proceeds to ACT 131.

In ACT 131, the processor 201 confirms whether the display of the guidance screen is instructed. If the corresponding event cannot be confirmed, the processor 201 determines NO and proceeds to ACT 132.

In ACT 132, the processor 201 confirms whether the display of the stockout screen is instructed. If the corresponding event cannot be confirmed, the processor 201 determines NO and returns to ACT 131.

Then, the processor 201 waits for the instruction of the display of the guidance screen or the stockout screen in ACTS 131 and 132.

If the instruction data instructing the display of the guidance screen is transmitted from the mobile controller 3 as described above, the processor 201 determines YES in ACT 131 and proceeds to ACT 133.

In ACT 133, the processor 201 displays the guidance screen indicating the screen data included in the instruction data on the touch panel 204.

In ACT 134, the processor 201 waits for end instruction. At this point, the processor 201 keeps the guidance screen displayed on the touch panel 204.

Meanwhile, if the instruction data instructing the display of the stockout screen is transmitted from the mobile controller 3 as described above, the processor 201 determines YES in ACT 132 and proceeds to ACT 135.

In ACT 135, the processor 201 displays the stockout screen indicating the screen data included in the instruction data on the touch panel 204.

Figure 25:
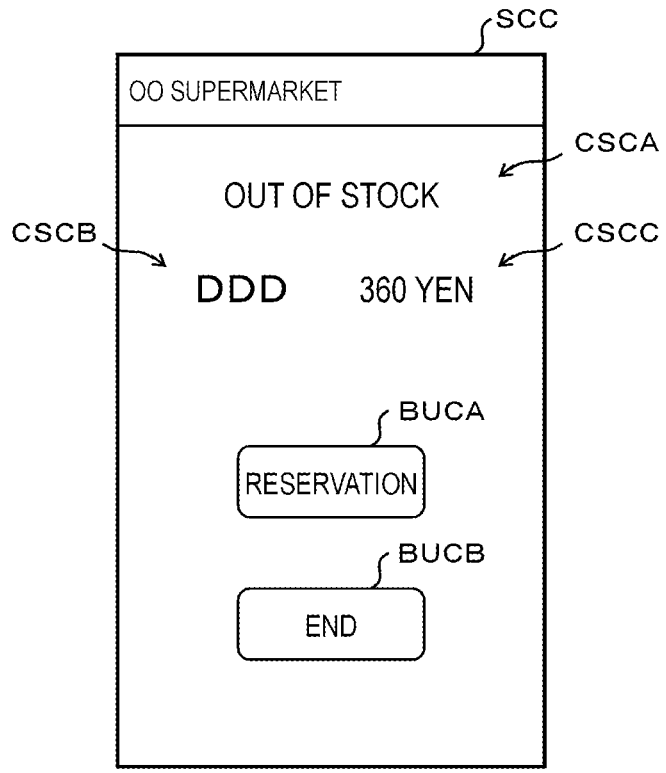
FIG. 25 is a diagram illustrating an example of a stockout screen.

FIG. 25 is a diagram illustrating an example of the stockout screen SCC on which the user terminal 200 is displayed. A stockout screen SCC includes the character string CSCA, CSCB, and CSCC and buttons BUCA and BUCB. The character string CSCA indicates a character message indicating that the merchandise designated as the target of the guide is out of stock. The character string CSCB indicates the name of the merchandise designated as the target of the guide. The character string CSCC indicates a unit price of the merchandise designated as the target of the guide. The button BUCA is a soft key for enabling the customer to designate the reservation registration of the designated merchandise. The button BUCB is a soft key for enabling the customer to designate the end of the confirmation work of the merchandise by the search function. The stockout screen SCC illustrated in FIG. 25 is an example if a guide of a merchandise having the unit price of "360 yen" and the name of "DDD" is requested.

In ACT 136, the processor 201 confirms whether the end instruction is made. Also, if the corresponding event cannot be confirmed, the processor 201 determines NO and proceeds to ACT 137.

In ACT 137, the processor 201 confirms whether the reservation instruction is made. Also, if the corresponding event cannot be confirmed, the processor 201 determines NO and returns to ACT 136.

The processor 201 waits for the end instruction or the reservation instruction in ACTS 136 and 137. The processor 201 keeps the stockout screen displayed on the touch panel 204 in the standby state.

The customer can check the guidance screen displayed on the touch panel 204 to know the display location of the desired merchandise. Also, if the guidance screen is not needed any more, the customer instructs the end, for example, by the predetermined operation such as a touch on the button provided on the guidance screen. In this case, the processor 201 determines YES in ACT 134 and proceeds to ACT 138.

The customer can check the stockout screen displayed on the touch panel 204 to know that the desired merchandise is out of stock. Also, if the customer determines not to purchase the merchandise notified as being out of stock on the stockout screen, the customer instructs the end, for example, by a predetermined operation such as a touch on the button BUCB. In this case, the processor 201 determines YES in ACT 136 and proceeds to ACT 138.

In ACT 138, the processor 201 notifies the mobile controller 3 of the end. The processor 201 transmits, for example, the notification data for end notification to the mobile controller 3 via the access point 6 and the in-store communication network 7. The processor 31 includes the identification data for identifying the notification of the end in the notification data.

If the customer determines to reserve the merchandise notified as being out of stock on the stockout screen, the customer instructs, for example, the reservation by the predetermined operation such as the touch on the button BUCA. In this case, the processor 201 determines YES in ACT 137 and proceeds to ACT 139.

In ACT 139, the processor 201 requests the reservation registration from the mobile controller 3. The processor 201 transmits, for example, the request data including the identification data for identifying the request of the reservation registration to the mobile controller 3.

If the end notification is made from the user terminal 200 as described above, the processor 31 of the mobile controller 3 determines YES in ACT 218 in FIG. 16 and proceeds to ACT 222.

In ACT 222, the processor 31 transmits the end notification to the virtual POS server 2. That is, the processor 31 transmits, for example, the notification data sent from the user terminal 200 for the end notification to the virtual POS server 2.

If the reservation registration is requested from the user terminal 200 as described above, the processor 31 determines YES in ACT 219 and proceeds to ACT 223.

In ACT 223, the processor 31 transmits the request data sent for the request of the reservation registration to the virtual POS server 2 with the notification of the transaction code correlated with the terminal code of the user terminal 200 in the data record of the transaction management database DBCA.

The display instruction of the guidance screen is made in ACT 314 of FIG. 20, and then the processor 21 of the virtual POS server 2 proceeds to ACT 315.

In ACT 315, the processor 21 waits for the end instruction.

After the display instruction of the stockout screen is made in ACT 316, the processor 21 proceeds to ACT 317.

In ACT 317, the processor 21 confirms whether the end instruction is made. Also, if the corresponding event cannot be confirmed, the processor 21 determines NO and proceeds to ACT 318.

In ACT 318, the processor 21 confirms whether the reservation registration is requested. Then, if the corresponding event cannot be confirmed, the processor 21 determines NO and returns to ACT 317.

The processor 21 waits for the request of the end instruction or the reservation registration in ACTS 317 and 318.

If the end notification is transmitted from the mobile controller 3 as described above, the processor 21 determines YES in ACT 315 or 317, and returns to the standby state of ACTS 302 to 307 in FIG. 19 as it is.

Meanwhile, if the request of the reservation registration is transmitted from the mobile controller 3 as described above, the processor 21 determines YES in ACT 318 and proceeds to ACT 319.

In ACT 319, the processor 21 registers the reserved merchandise. For example, if the data record REB in which the transaction code notified together with the request data for the request of the reservation registration described above is set in the field FAA is not included in the transaction database DBBA, the processor 21 sets the transaction code in the field FAA and also adds the new data record REB in which the new merchandise data is set in the field FAC to the transaction database. For example, if the data record REB in which the transaction code is set in the field FAA is already included in the transaction database DBBA, the processor 21 adds the new field to the end of the corresponding data record REB and adds new merchandise data. For example, the processor 21 includes the merchandise code included in the request data for the request of the guide, the merchandise name and the price of the merchandise identified by the merchandise code, and the quantity "1" in the new merchandise data to be added here, and the reservation flag is set to a state indicating the reserved merchandise.

As above, the processor 21 determines the merchandise determined in response to the designation of the customer as the reserved merchandise and registers the reserved merchandise as one merchandise to be purchased. Also, the processor 21 performs the information process based on the virtual POS app APB so that the computer including the processor 21 as the central portion functions as the determination unit, the generation unit, and the decision unit. If the merchandise designated as the guide target by the customer is out of stock, the function as the generation unit by the processor 21 includes the merchandise in the list indicated by the data record REB as the reserved merchandise only if the reservation is designated by the user terminal 200.

In ACT 320, the processor 21 transmits the result data indicating the result of the process for the reservation registration to the mobile controller 3. The processor 21 includes identification data for identifying the notification of the regular registration, the merchandise code, the merchandise name, the price, the quantity, and the reservation flag of the registered merchandise in the result data. Also, the processor 21 then returns to the standby state of ACTS 302 to 307 in FIG. 19.

The processor 31 of the mobile controller 3 transmits the request of the reservation registration in ACT 223 in FIG. 16, and then proceeds to ACT 224.

In ACT 224, the processor 31 acquires the result data transmitted from the virtual POS server 2 as above. The processor 31 stores the acquired result data in the main memory 32 or the auxiliary storage unit 33.

In ACT 225, the processor 31 updates the registration database DBCB based on the result data. The processor 31 adds, for example, a new field after the last field already existing in the data record REC correlated with the transaction to be processed and adds the new registration data in the corresponding field. The processor 31 includes a merchandise code included in the result data, the error flag set as "0" indicating that there is no error, the merchandise name, the price, and the quantity included in the result data, the reservation flag set as the state indicating that the reservation is made, and the cancellation flag set as "0" indicating that cancellation is not made, in the new registration data.

If ACT 225 ends, the processor 31 proceeds to ACT 226. If the end notification is transmitted in ACT 222, the processor 31 proceeds to ACT 226.

In ACT 226, the processor 31 instructs the user terminal 200 to display the list screen. The processor 31 transmits, for example, the instruction data including the identification data for identifying the display instruction of the list screen to the user terminal 200 via the in-store communication network 7 and the access point 6. The processor 31 includes the merchandise code, the merchandise name, the price, and the quantity included in the data record REC correlated with the transaction to be processed in the registration database DBCB, in the instruction data. Also, the processor 31 then returns to the standby state of ACTS 205 to 210 in FIG. 15.

The processor 201 of the user terminal 200 performs the end notification in ACT 138 in FIG. 12 or requests the reservation registration in ACT 139, and then proceeds to ACT 140.

In ACT 140, the processor 201 waits for the instruction of the display of the list screen. Also, for example, if the display of the list screen is instructed from the mobile controller 3 as described above, the processor 201 determines YES, returns to ACT 112 in FIG. 11, and displays the list screen SCA on the touch panel 204, again.

Figure 26:
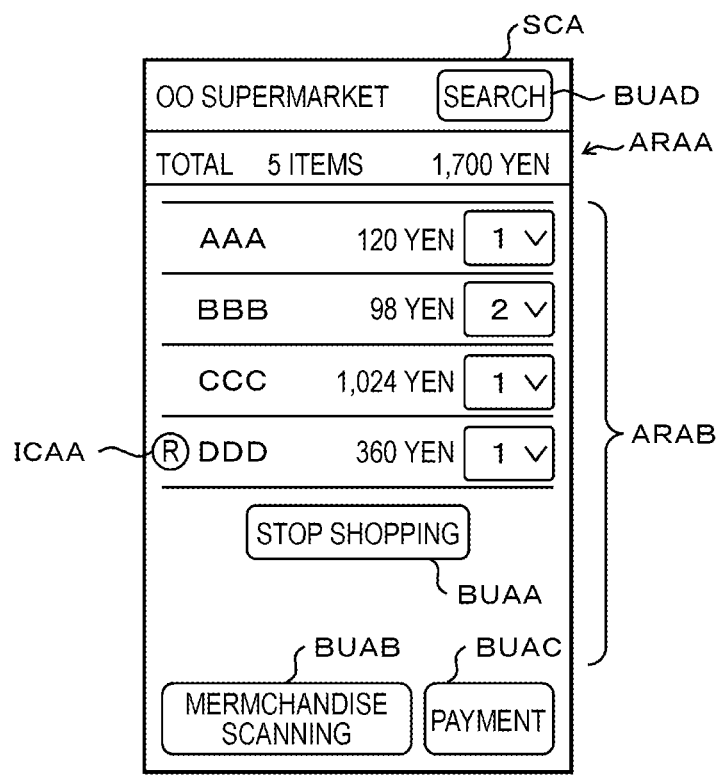
FIG. 26 is a diagram illustrating an example of a list screen in a state in which the registration of merchandise to be purchased including a reserved merchandise is completed.

FIG. 26 is a diagram illustrating an example of the list screen SCA in a state in which the merchandise to be purchased including the reserved merchandise are registered.

The list screen SCA illustrated in FIG. 26 is an example if one merchandise having the merchandise name of "AAA" and the price of 120 yen, two merchandise having the merchandise name of "BBB" and the price of 98 yen, and one merchandise having the merchandise name of "CCC" and the price of 1,024 yen are registered as the merchandise to be purchased that are not reserved merchandise. The list screen SCA illustrated in FIG. 26 is an example if one merchandise having the merchandise name of "DDD" and the price of 360 yen is registered as a reserved merchandise. The list screen SCA illustrated in FIG. 26 indicates the merchandise names, the prices, and the quantities relating to the registered merchandise in the display area ARAB. In the display area ARAA, "5" is indicated as the total number, and "1,700" is indicated as the total amount. An icon ICAA indicates that the merchandise having the merchandise name of "DDD" is a reserved and registered merchandise.

If the customer touches the area indicating the quantity on the list screen SCA, the processor 201 displays a list box for quantity designation to be overlapped on the list screen SCA. Also, if the list box is operated, the processor 201 receives the operation as the designation of the quantity. In this case, the processor 201 determines YES in ACT 115 in FIG. 11 and proceeds to ACT 141 in FIG. 13.

In ACT 141, the processor 201 confirms whether the number of designations is 0. If the number of designations is not 0, the processor 201 determines NO and proceeds to ACT 142.

In ACT 142, the processor 201 requests the quantity change from the mobile controller 3. The processor 201 includes specifying data for specifying the merchandise of which the quantity is designated and the number of designations in the request data to be transmitted here. The specifying data may be a merchandise code and may be data that can specify merchandise to be purchased only by the mobile controller 3 such as the number for identifying the merchandise to be purchased in the list of the merchandise to be purchased. If the merchandise code is used as the specifying code, the processor 31 includes a merchandise code relating to each merchandise to be purchased in the instruction data for instructing the display of the list screen.

Figure 17:
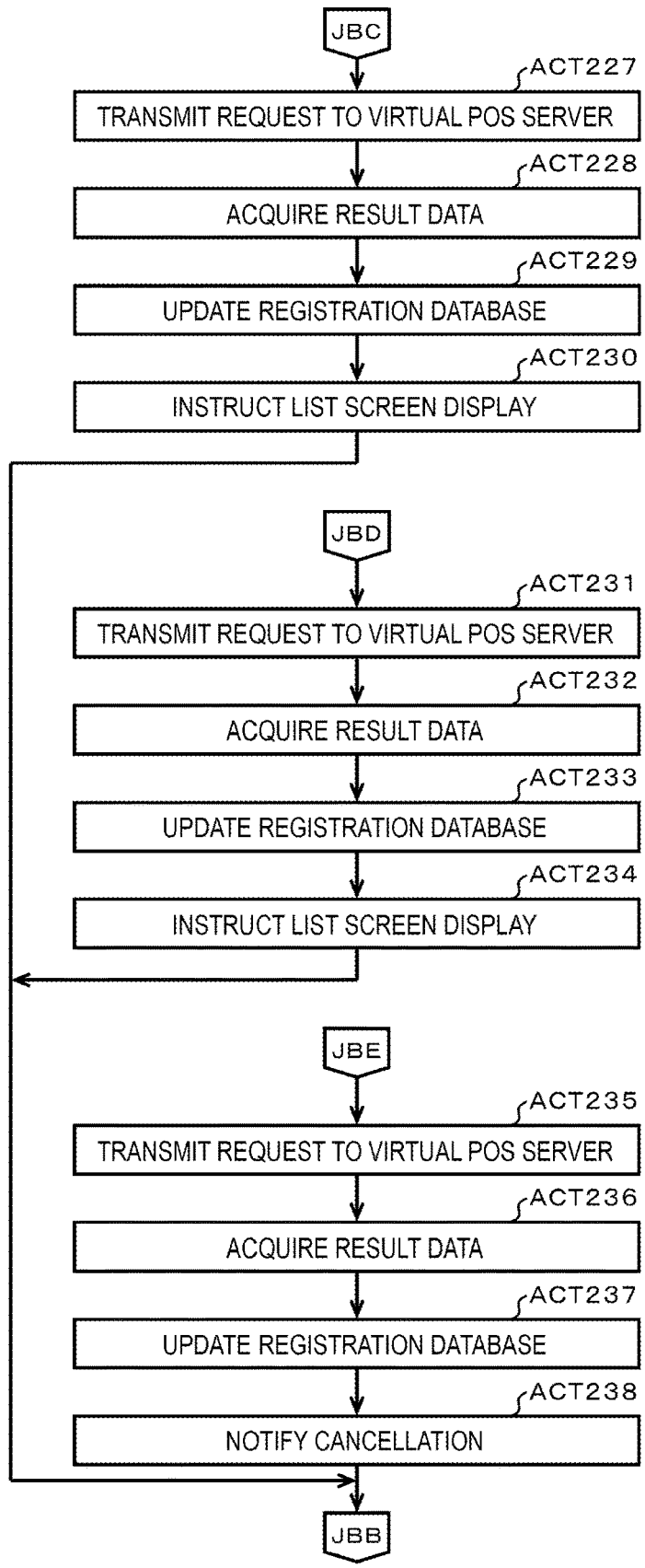
FIG. 17 is a flowchart of the transaction process by the processor illustrated in FIG. 6.

If the quantity change is requested from the user terminal 200 as above, the processor 31 of the mobile controller 3 determines YES in ACT 207 in FIG. 15 and proceeds to ACT 227 in FIG. 17.

In ACT 227, the processor 31 transmits the request of the quantity change to the virtual POS server 2 with the notification of the transaction code. At this point, the processor 31 may add the transaction code to the request data sent from the user terminal 200 and transmit the transaction code to the virtual POS server 2, and may add the transaction code to the request data after the conversion by some processes and transmit the transaction code to the virtual POS server 2. Here, the processor 31 notifies the quantity included in the request data sent from the user terminal 200 to the virtual POS server 2. If the specifying data included in the request data is not the merchandise code, the processor 31 replaces the corresponding specifying data with the merchandise code.

If the request of the quantity change is transmitted from the mobile controller 3, the processor 21 of the virtual POS server 2 determines YES in ACT 304 in FIG. 19 and proceeds to ACT 321.

In ACT 321, the processor 21 considers that the quantity included in the request data sent from the mobile controller 3 is input by an input device included in the POS terminal in the related art, and updates the transaction database DBBA to change the quantity of the merchandise to be purchased by the same processes as in the POS terminal in the related art.

In ACT 322, the processor 21 transmits the merchandise code of the merchandise of which the quantity is changed, the result data that indicates the quantity after the change, to the mobile controller 3. Also, the processor 21 then returns to the standby state of ACTS 302 to 307.

The processor 31 of the mobile controller 3 transmits the request of the quantity change in ACT 227 in FIG. 17 and proceeds to ACT 228.

In ACT 228, the processor 31 acquires the result data transmitted from the virtual POS server 2 as above. The processor 31 stores the acquired result data in the main memory 32 or the auxiliary storage unit 33.

In ACT 229, the processor 31 updates the registration database DBCB based on the result data. That is, the processor 31 finds the registration data including the notified merchandise code from the correlated data record REC. The processor 31 rewrites the quantity included in the corresponding registration data to the quantity included in the result data.

The processor 31 may store the specifying data and the quantity sent by the request data of the quantity change in the main memory 32 or the auxiliary storage unit 33 and rewrite the quantity of the registration data relating to the merchandise specified by the stored specifying data to the stored quantity, in response to the reception of the result data indicating that the update is completed. In this case, the processor 21 of the virtual POS server 2 may not include the merchandise code and the quantity in the result data.

In ACT 230, the processor 31 instructs the user terminal 200 to display the list screen. The processor 31 includes the merchandise codes, the merchandise names, the prices, and the quantities included in the registration data having the cancellation flag of "0" among the registration data included in the data record REC updated as above, in the instruction data. The processor 31 then returns to the standby state of ACTS 205 to 210 in FIG. 15.

Figure 13:
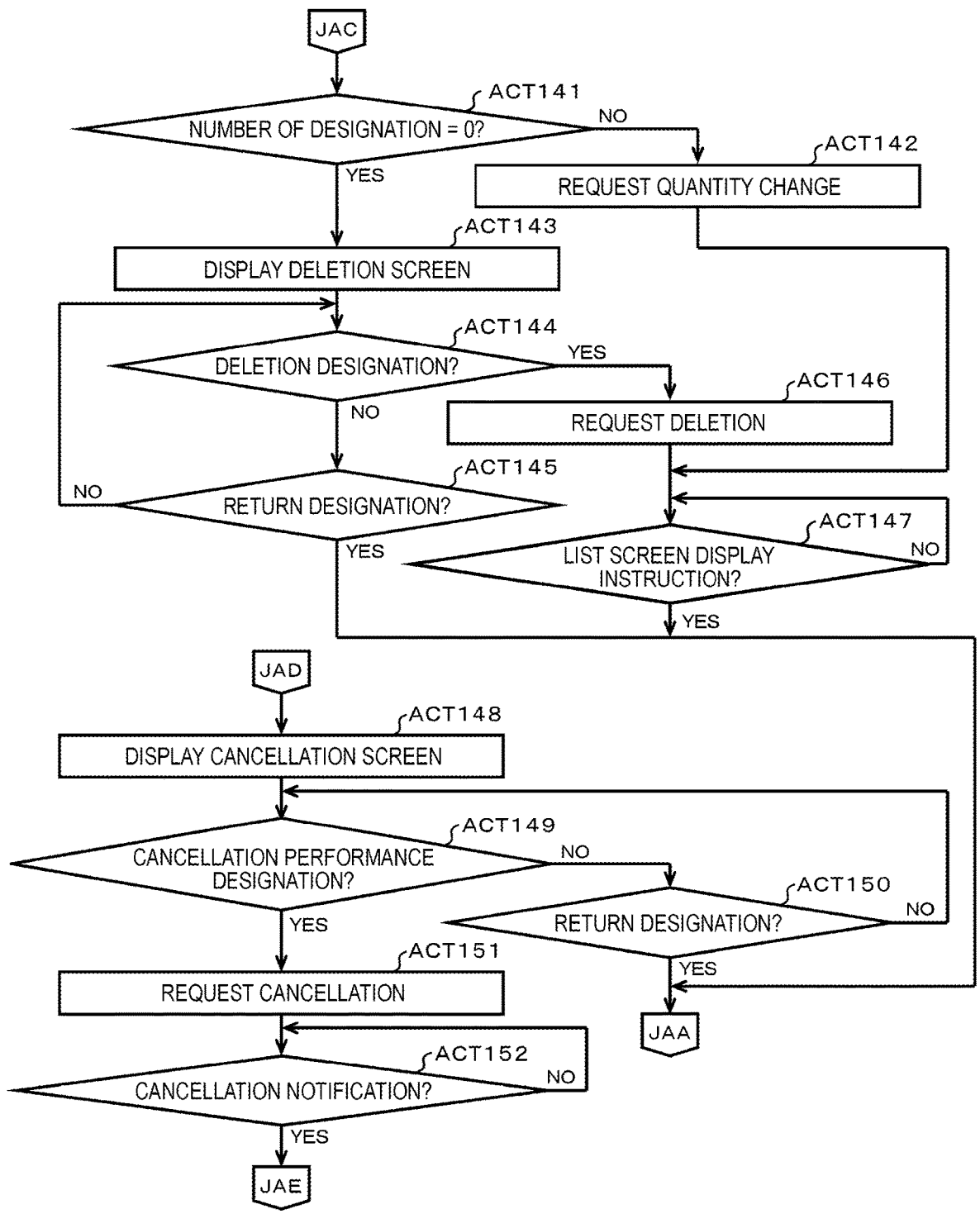
FIG. 13 is a flowchart of the information process by the processor illustrated in FIG. 8.

If the number of designations for the quantity change is 0, the processor 201 of the user terminal 200 determines YES in ACT 141 in FIG. 13 and proceeds to ACT 143.

In ACT 143, the processor 201 displays the deletion screen on the touch panel 204. The deletion screen is a screen reporting to the customer that the merchandise designated to have the quantity set as 0 is deleted from the merchandise to be purchased. The deletion screen includes a deletion button for designating deletion and a return button for designating the return to the state before designating the change of the quantity without changing the quantity.

In ACT 144, the processor 201 confirms whether deletion is designated. Also, if the corresponding event cannot be confirmed, the processor 201 determines NO and proceeds to ACT 145.

In ACT 145, the processor 201 confirms whether the return is designated. Also, if the corresponding event cannot be confirmed, the processor 201 determines NO and returns to ACT 144.

The processor 201 waits for the designation of the deletion or the return in ACTS 144 and 145.

If the customer desires to stop the deletion and return to the state before designating the change of the quantity, the return is designated by a predetermined operation such as a touch on the return button on the deletion screen. In response to this, the processor 201 determines YES in ACT 145, returns to ACT 112 in FIG. 11, and displays the list screen SCA on the touch panel 204, again. In this case, since the registration state of the merchandise to be purchased is not changed, the processor 201 displays the list screen SCA in the same state as the screen displayed before the deletion screen is displayed on the touch panel 204, again.

If performing the deletion is for sure, the customer designates the deletion by a predetermined operation such as a touch on the deletion button on the deletion screen. In response to this, the processor 201 determines YES in ACT 144 and proceeds to ACT 146.

In ACT 146, the processor 201 requests the deletion from the mobile controller 3. The processor 201 includes specifying data for specifying the merchandise of which the deletion is designated in the request data to be transmitted here.

If the deletion is requested from the user terminal 200 as above, the processor 31 of the mobile controller 3 determines YES in ACT 208 in FIG. 15 and proceeds to ACT 231 in FIG. 17.

In ACT 231, the processor 31 transmits the request of the deletion to the virtual POS server 2 with the notification of the transaction code. At this point, the processor 31 may add the transaction code to the request data sent from the user terminal 200 and transmit the transaction code to the virtual POS server 2 or may add the transaction code to the request data after conversion by some processes and transmit the transaction code to the virtual POS server 2. Here, if the specifying data included in the request data is not the merchandise code, the processor 31 replaces the corresponding specifying data with the merchandise code.

If the request of the deletion is transmitted from the mobile controller 3, the processor 21 of the virtual POS server 2 determines YES in ACT 305 in FIG. 19 and proceeds to ACT 323.

In ACT 323, the processor 21 considers that the request by the request data sent from the mobile controller 3 is the deletion instruction input by the input device included in the POS terminal in the related art, and updates the transaction database DBBA to exclude the merchandise to be a target by the same process as in the POS terminal in the related art from the merchandise to be purchased.

In ACT 324, the processor 21 transmits the result data indicating the merchandise code of the merchandise excluded from the merchandise to be purchased to the mobile controller 3. Also, the processor 21 then returns to the standby state of ACTS 302 to 307.

The processor 31 of the mobile controller 3 transmits the request of the deletion in ACT 231 in FIG. 17, and then proceeds to ACT 232.

In ACT 232, the processor 31 acquires the result data transmitted from the virtual POS server 2 as above. The processor 31 stores the acquired result data in the main memory 32 or the auxiliary storage unit 33.

In ACT 233, the processor 31 updates the registration database DBCB based on the result data. That is, the processor 31 finds the registration data including notified merchandise code from the data record REC correlated with the transaction. Then, the processor 31 changes the cancellation flag included in the corresponding registration data to "1".

The processor 31 may store the specifying data sent by the request data of the deletion in the main memory 32 or the auxiliary storage unit 33 and change the cancellation flag of the registration data relating to the merchandise specified by the stored specifying data in response to the reception of the result data indicating that the deletion is completed. In this case, the processor 21 of the virtual POS server 2 may not include the merchandise code in the result data.

In ACT 234, the processor 31 instructs the user terminal 200 to display the list screen. The processor 31 includes the merchandise code, the merchandise name, the price, and the quantity included in the registration data having the cancellation flag of "0" among the registration data included in the updated data record REC as above, in the instruction data. The processor 31 then returns to the standby state of ACTS 205 to 210 in FIG. 15.

The processor 201 of the user terminal 200 requests the quantity change in ACT 142 in FIG. 13 or requests the deletion in ACT 146, and then proceeds to ACT 147.

In ACT 147, the processor 201 waits for the instruction of the display of the list screen. If the display of the list screen is instructed from the mobile controller 3 as described above in response to the request of the quantity change or in response to the request of the deletion, the processor 201 determines YES, returns to ACT 112 in FIG. 11, and displays the list screen SCA on the touch panel 204, again. At this point, the processor 201 sets the list screen SCA as a screen indicating the merchandise names, the prices, and the quantities of the merchandise to be purchased included in the instruction data. In this case, since the registration state of the merchandise to be purchased is changed, the processor 201 displays the list screen SCA in a state different from the screen displayed if the quantity change or the deletion is designated on the touch panel 204.

If the customer wants to cancel all merchandise to be purchased registered before and stop the shopping, the customer designates the stop by a predetermined operation such as a touch on the button BUAA on the list screen SCA. In response to this, the processor 201 determines YES in ACT 116 in FIG. 11 and proceeds to ACT 148 in FIG. 13.

In ACT 148, the processor 201 displays a cancellation screen on the touch panel 204. The cancellation screen is a screen reporting to the customer that all merchandise to be purchased registered before are cancelled. The cancellation screen includes a performance button for designating the cancellation performance and a return button for designating the return to the state before designating the change of the quantity without changing the quantity.

In ACT 149, the processor 201 confirms whether the cancellation performance is designated. Also, if the corresponding event cannot be confirmed, the processor 201 determines NO and proceeds to ACT 150.

In ACT 150, the processor 201 confirms whether the return is designated. Also, if the corresponding event cannot be confirmed, the processor 201 determines NO and returns to ACT 149.

The processor 201 waits for the designation of the cancellation performance or the return in ACTS 149 and 150.

If the customer continues shopping as it is, the customer designates the return by a predetermined operation such as a touch on the return button on the cancellation screen. In response to this, the processor 201 determines YES in ACT 150, returns to ACT 112 in FIG. 11, and displays the list screen SCA on the touch panel 204, again. In this case, since the registration state of merchandise to be purchased is not changed, the processor 201 displays the list screen SCA in the same state as the screen displayed before the cancellation screen is displayed on the touch panel 204, again.

If the customer stops shopping, the cancellation performance is designated by the predetermined operation such as a touch on the performance button on the cancellation screen. In response to this, the processor 201 determines YES in ACT 149 and proceeds to ACT 151.

In ACT 151, the processor 201 requests the cancellation from the mobile controller 3.

If the cancellation is requested from the user terminal 200 as above, the processor 31 of the mobile controller 3 determines YES in ACT 209 in FIG. 15 and proceeds to ACT 235 in FIG. 17.

In ACT 235, the processor 31 transmits the request of the cancellation to the virtual POS server 2 with the notification of the transaction code. At this point, the processor 31 may add the transaction code to the request data sent from the user terminal 200 and transmit the transaction code to the virtual POS server 2 or may add the transaction code to the request data after conversion by some processes and transmit the transaction code to the virtual POS server 2.

If the request of the cancellation is transmitted from the mobile controller 3, the processor 21 of the virtual POS server 2 determines YES in ACT 306 in FIG. 19 and proceeds to ACT 325.

In ACT 325, the processor 21 considers that the request by the request data sent from the mobile controller 3 is the cancellation instruction input by the input device included in the POS terminal in the related art and updates the transaction database DBBA to exclude all registered merchandise in correlation with the notified transaction codes by the same process as in the POS terminal in the related art from the merchandise to be purchased.

In ACT 326, the processor 21 transmits the result data indicating that the cancellation is completed to the mobile controller 3. Also, the processor 21 then returns to the standby state of ACTS 302 to 307.

The processor 31 of the mobile controller 3 transmits the request of the deletion in ACT 235 in FIG. 17, and then proceeds to ACT 236.

In ACT 236, the processor 31 acquires the result data transmitted from the virtual POS server as above. The processor 31 stores the acquired result data in the main memory 32 or the auxiliary storage unit 33.

In ACT 237, the processor 31 updates the registration database DBCB based on the result data. That is, the processor 31 changes the cancellation flag set as "0" to "1" regarding all registration data included in the data record REC correlated with the transaction to be processed.

In ACT 238, the processor 31 notifies the user terminal 200 of the cancellation. The processor 31 then returns to the standby state of ACTS 205 to 210 in FIG. 15.

The processor 201 of the user terminal 200 requests the cancellation in ACT 151 in FIG. 13, and then proceeds to ACT 152.

In ACT 152, the processor 201 waits for the notification of the cancellation from the mobile controller 3. If the cancellation is notified as described above, the processor 201 determines YES and returns to ACT 101 in FIG. 10.

If the customer finishes registering all merchandise desired to purchase as the merchandise to be purchased or the reserved merchandise, the customer proceeds to the settlement. At this point, the customer designates the payment start by a predetermined operation such as a touch on the button BUAC on the list screen SCA. In response to this, the processor 201 determines YES in ACT 117 in FIG. 11 and proceeds to ACT 153 in FIG. 14.

In ACT 153, the processor 201 requests the payment from the mobile controller 3.

Figure 18:
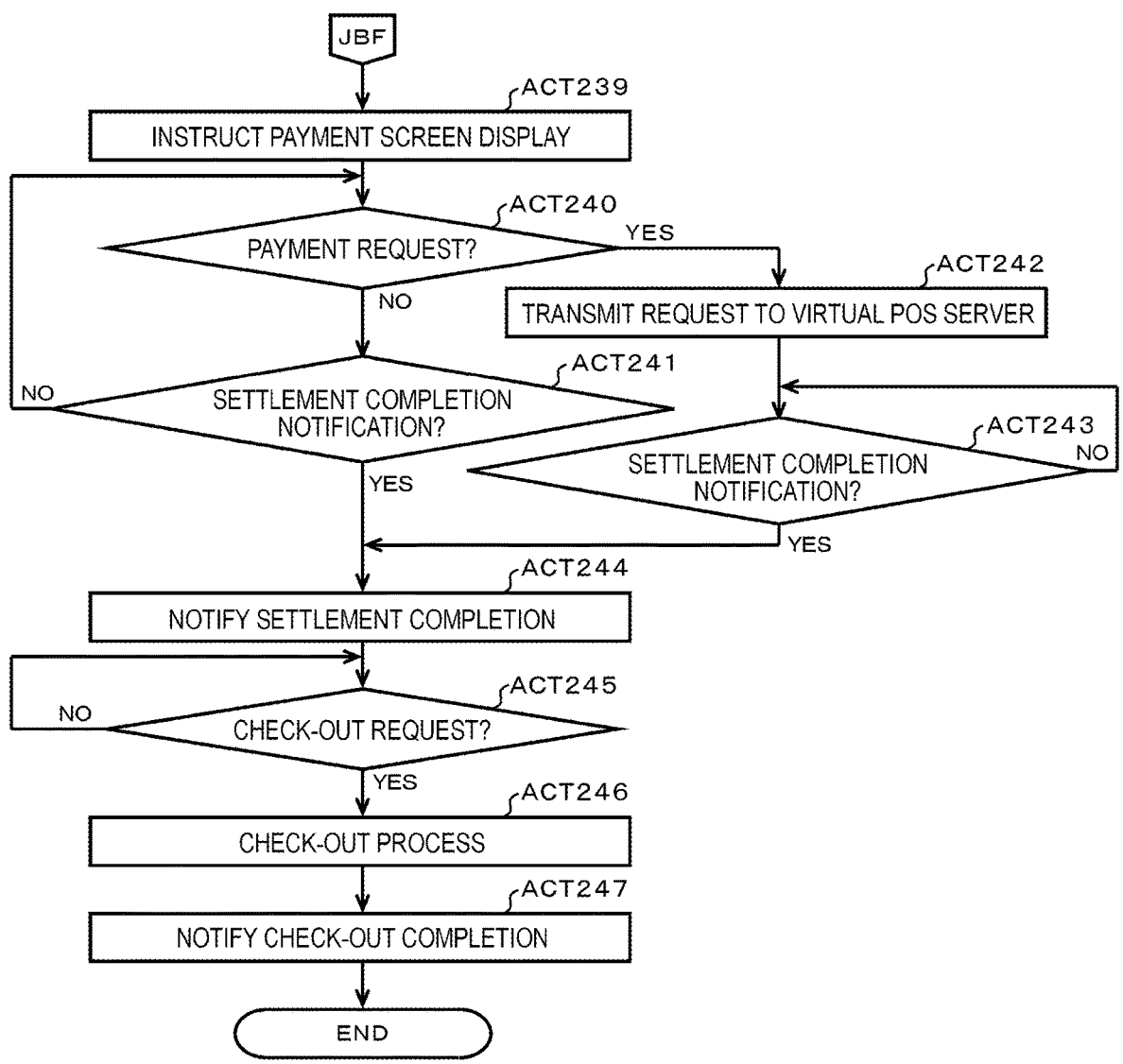
FIG. 18 is a flowchart of the transaction process by the processor illustrated in FIG. 6.

The payment is requested from the user terminal 200 as above, the processor 31 of the mobile controller 3 determines YES in ACT 210 in FIG. 15 and proceeds to ACT 239 in FIG. 18.

In ACT 239, the processor 31 instructs the user terminal 200 to display the payment screen.

Figure 14:
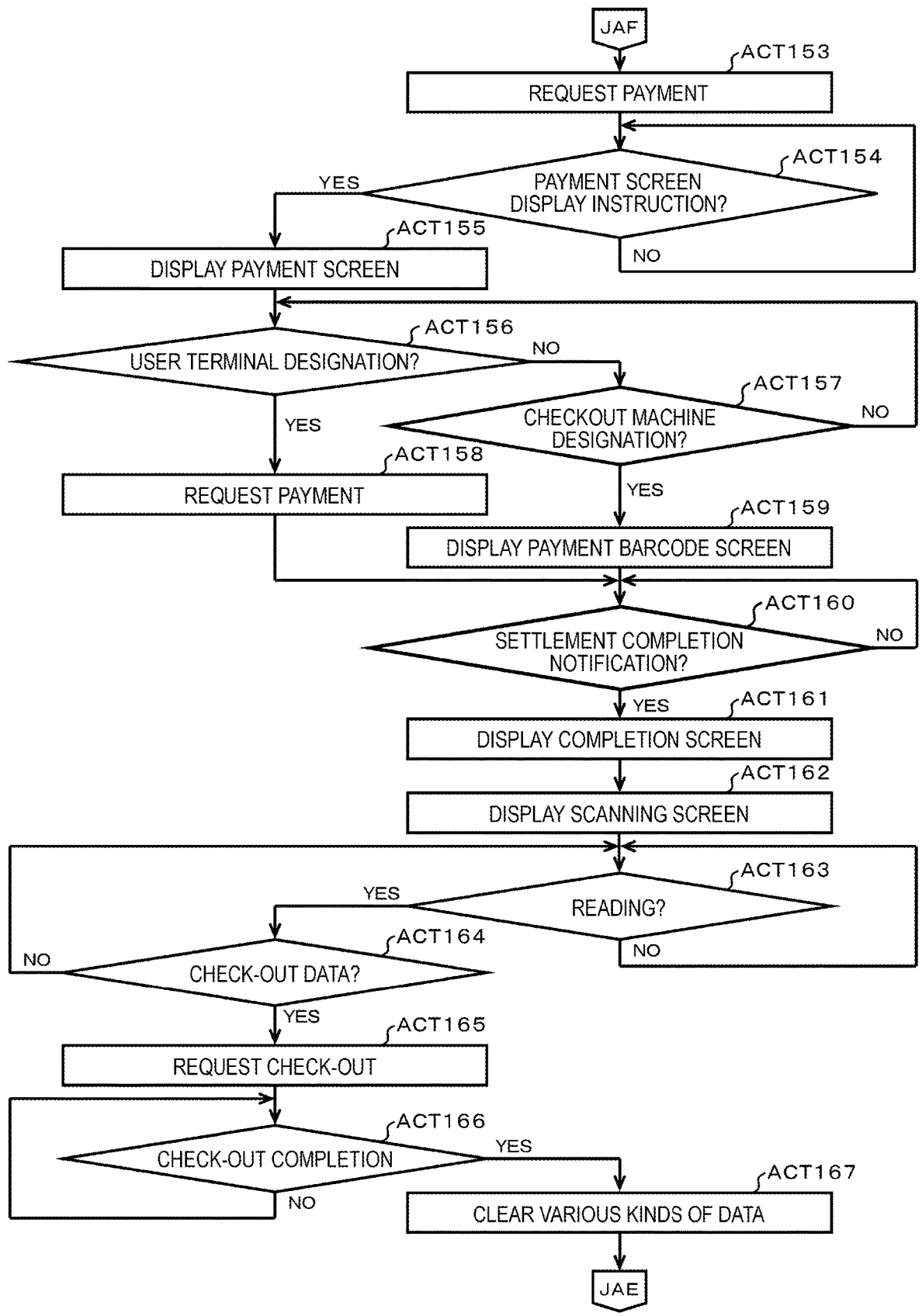
FIG. 14 is a flowchart of a transaction process by the processor illustrated in FIG. 8.

The processor 201 of the user terminal 200 requests the payment in ACT 153 in FIG. 14, and then proceeds to ACT 154.

In ACT 154, the processor 201 waits for the instruction of the display of the payment screen. Also, if it is confirmed that the display of the payment screen is instructed as described above, the processor 201 determines YES in ACT 154 and proceeds to ACT 155.

In ACT 155, the processor 201 displays the payment screen on the touch panel 204. The payment screen is a screen for enabling the customer to select whether to perform the operation for settling the price with any one of the user terminal 200 and the checkout machine 5.

If the operation for settling the price is performed by the user terminal 200, the customer designates the user terminal 200 by the predetermined operation. If the operation for settling the price is performed by the checkout machine 5, the customer designates the checkout machine 5 by a predetermined operation.

In ACT 156, the processor 201 confirms whether the user terminal 200 is designated. If the corresponding event cannot be confirmed, the processor 201 determines NO and proceeds to ACT 157.

In ACT 157, the processor 201 confirms whether the checkout machine 5 is designated. Also, if the corresponding event cannot be confirmed, the processor 201 determines NO and returns to ACT 156.

The processor 201 waits for the designation of the user terminal 200 or the checkout machine 5 in ACTS 156 and 157. If the user terminal 200 is designated as described above, the processor 201 determines YES in ACT 156 and proceeds to ACT 158.

In ACT 158, the processor 201 requests the payment from the mobile controller 3. The processor 201 includes settlement data such as a credit number or a user code for an on-line settlement service required for the settlement in the request data for requesting the payment.

If the checkout machine 5 is designated as described above, the processor 201 determines YES in ACT 157 and proceeds to ACT 159.

In ACT 159, the processor 201 displays the payment barcode screen on the touch panel 204. The payment barcode screen is a screen indicating a payment barcode indicating data required for acquiring data relating to the content of the transaction (hereinafter, referred to as payment data) from the virtual POS server 2 by the checkout machine 5. Though specific processes are not illustrated, the processor 201 acquires the payment barcode from the virtual POS server 2 via the mobile controller 3 and represents the corresponding payment barcode on the payment barcode screen.

The customer causes the scanner included in the checkout machine 5 that is not used by the other customers to read the payment barcode. In response to this, the checkout machine 5 performs a process of acquiring the payment data from the virtual POS server 2 according to the data indicated by the payment barcode and settling the settlement amount determined based on the payment data. If the settlement is completed, the checkout machine 5 notifies the virtual POS server 2 of the settlement completion. If the settlement completion is notified from the checkout machine 5, the processor 21 of the virtual POS server 2 notifies the mobile controller 3 of the settlement completion. In addition, the settlement completion in the checkout machine 5 may be directly notified from the checkout machine 5 to the mobile controller 3.

The processor 31 of the mobile controller 3 instructs the display of the payment screen in ACT 239 in FIG. 18, and then proceeds to ACT 240.

In ACT 240, the processor 31 confirms whether the payment is requested. Also, if the corresponding event cannot be confirmed, the processor 31 determines NO and proceeds to ACT 241.

In ACT 241, the processor 31 confirms whether the settlement completion is notified. Also, if the corresponding event cannot be confirmed, the processor 31 determines NO and returns to ACT 240.

The processor 31 waits for the payment request or the settlement completion notification in ACTS 240 and 241. If the payment is requested from the user terminal 200 as described above, the processor 31 determines YES in ACT 240 and proceeds to ACT 242.

In ACT 242, the processor 31 transmits the request of the payment to the virtual POS server 2 with the notification of the transaction code of the transaction to be processed. At this point, the processor 31 may transmit the request data sent from the user terminal 200 to the virtual POS server 2 without change or may transmit the request data after conversion by some processes to the virtual POS server 2.

If the request of the payment is transmitted from the mobile controller 3, the processor 21 of the virtual POS server 2 determines YES in ACT 307 in FIG. 19 and proceeds to ACT 327 in FIG. 21.

In ACT 327, the processor 21 considers that the request by the request data sent from the mobile controller 3 is the payment instruction input by the input device included in the POS terminal in the related art, and performs a process for calculating the price relating to the transaction identified by the notified transaction code by the same process as in the POS terminal in the related art and settling based on the settlement data. That is, the processor 21 searches the transaction database DBBA for the data record REB in which the notified transaction code is set in the field FAA and calculates the price based on the merchandise data included in the corresponding data record REB. At this point, the processor 21 considers all merchandise data regardless of the state of the reservation flag included in each merchandise data. That is, the processor 21 is set as a target of the settlement with respect to the merchandise registered as the reserved merchandise. The process for the settlement includes, for example, settlement request to a settlement server (not illustrated).

The processor 21 performs the information process based on the virtual POS app APB so that the computer including the processor 21 as the central portion functions as a settlement unit.

In ACT 328, the processor 21 confirms whether the reserved merchandise is included in the merchandise set as the target of the transaction of which the settlement is completed as above. For example, if any one reservation flag of the merchandise data included in the data record REB searched in ACT 327 indicates that a reservation is made, the processor 21 determines that there is a reserved merchandise, determines YES, and proceeds to ACT 329.

In ACT 329, the processor 21 notifies the store server 1 of the new reservation. The processor 21 transmits, for example, notification data for notifying the reservation to the store server 1 via the in-store communication network 7. The processor 21 includes identification data for identifying a reservation notification, a user code that is set in the field FAB of the data record REB searched in ACT 327, and a set of the merchandise code and the quantity with respect to the reserved merchandise newly registered, in the notification data.

The processor 11 of the store server 1 performs the information process for managing the inventory status of the merchandise in the store (hereinafter, referred to as inventory management process) based on the store management app APA.

Figure 27:
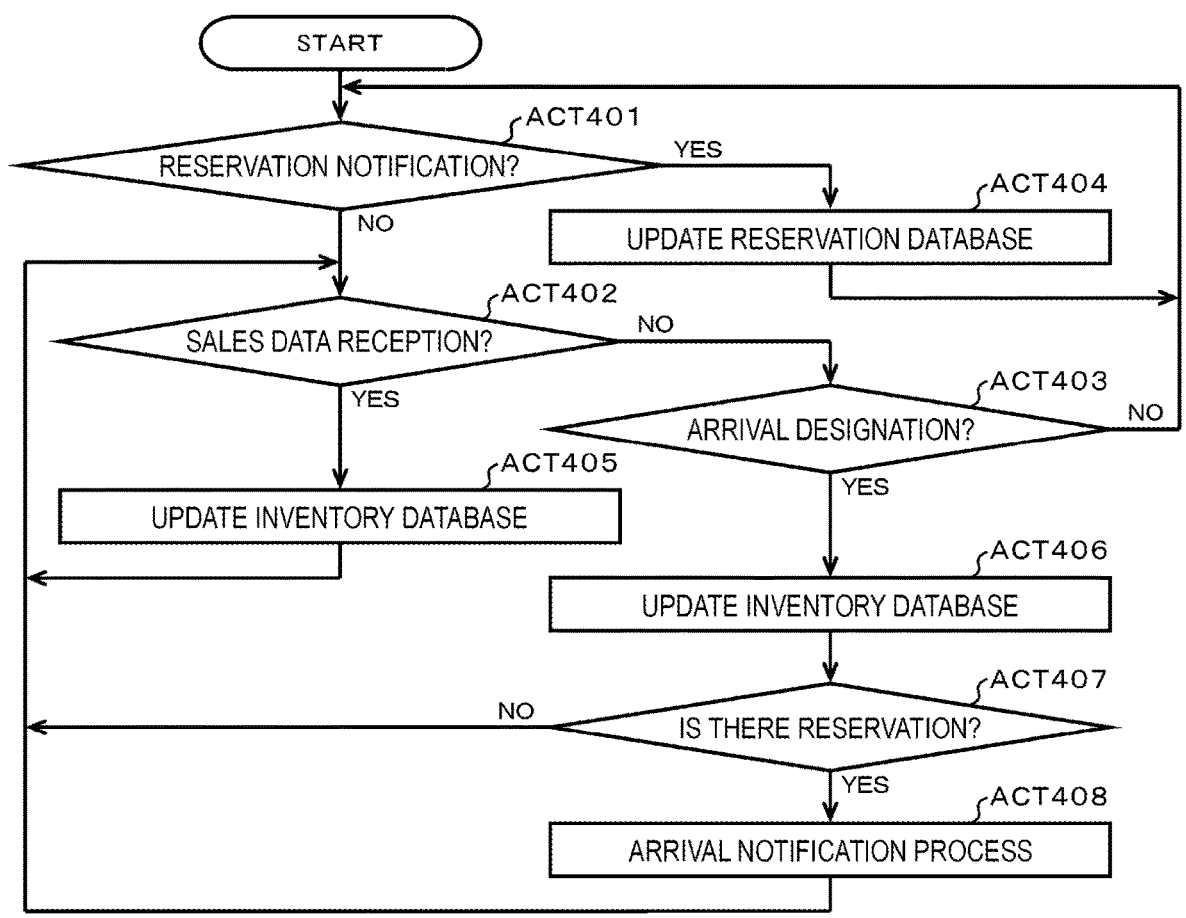
FIG. 27 is a flowchart of an information process by a processor illustrated in FIG. 2.

FIG. 27 is a flowchart of the inventory management processes by the processor 11.

In ACT 401, the processor 11 confirms whether there is the reservation notification. Also, if the corresponding event cannot be confirmed, the processor 11 determines NO and proceeds to ACT 402.

In ACT 402, the processor 11 confirms whether the sales data is received. Also, if the corresponding event cannot be confirmed, the processor 11 determines NO and proceeds to ACT 403.

In ACT 403, the processor 11 confirms whether there is arrival instruction. Also, if the corresponding event cannot be confirmed, the processor 11 determines NO and returns to ACT 401.

The processor 11 waits for the reservation notification, the reception of the sales data, or the arrival instruction in ACTS 401 to 403.

If the notification data transmitted from the virtual POS server 2 for the reservation notification as described above is received by the communication interface 14, the processor 11 determines YES in ACT 401 and proceeds to ACT 404.

In ACT 404, the processor 11 updates the reservation database DBAC to add the new data record REA relating to the reserved merchandise to be the target of the transaction of which the settlement is completed as above. The processor 11 sets, for example, a reservation code different from the reservation code set in the field FBA of the other data record REA, in the field FBA of the new data record REA. The processor 11 sets, for example, the user code included in the notification data in the field FBB of the new data record REA. The processor 11 sets, for example, respective sets of merchandise codes and quantities included in the notification data in the fields FBC and FBD of the new data record REA. The processor 11 sets, for example, date and time tracked by a software timer realized as another process, for example, in the field FBE of the new data record REA. The processor 11 may set, for example, date and time tracked by a hardware timer provided in the virtual POS server 2 in the field FBE of the new data record REA. The processor 11 sets, for example, the notification flag in a state of indicating that arrival notification is not completed in the field FBF of the new data record REA.

The processor 11 then returns to the standby state of ACTS 401 to 403.

As above, the processor 11 adds the data record REA to the reservation database DBAC and manages the reserved merchandise in correlation with the customer. The information process based on the store management app APA is performed by the processor 11 so that the computer including the processor 11 as the central portion functions as a management unit.

If ACT 329 in FIG. 21 ends, the processor 21 of the virtual POS server 2 proceeds to ACT 330. If all of the reservation flags included in all merchandise data included in the data record REB searched in ACT 327 indicate that reservation is not made, the processor 21 determines that there is no reserved merchandise and determines NO in ACT 328. In this case, the processor 21 skips ACT 329 and proceeds to ACT 330.

In ACT 330, the processor 21 transmits the result data indicating that the settlement is completed to the mobile controller 3.

In ACT 331, the processor 21 transmits the sales data to the store server 1. The sales data is data that enables the store server 1 to grasp the merchandise handed over to the customer in the transaction of which the settlement is completed as above. That is, the sales data includes a set of the merchandise codes and the quantities regarding the respective merchandise to be purchased other than the reserved merchandise. The sales data may be in common with so-called transaction data collected by the store server 1 in order to comprehensively manage the transactions performed in the store or may be different data. Then, the processor 21 ends the transaction process.

The processor 31 of the mobile controller 3 transmits the request of the payment to ACT 242 in FIG. 18 and proceeds to ACT 243.

In ACT 243, the processor 31 waits for the notification of the settlement completion from the virtual POS server 2. If the result data that the virtual POS server 2 transmits as described above and that indicates that the settlement is completed is received by the communication interface 34, the processor 31 determines YES and proceeds to ACT 244. If the settlement completion in the checkout machine 5 is notified as described above, the processor 31 determines YES in ACT 241 and proceeds to ACT 244.

In ACT 244, the processor 31 notifies the user terminal 200 of the settlement completion.

The processor 201 of the user terminal 200 requests the payment from the mobile controller 3 in ACT 158 in FIG. 14 or displays the payment barcode screen in ACT 159, and then proceeds to ACT 160.

In ACT 160, the processor 201 waits for the notification of the settlement completion. Also, if the settlement completion is notified from the mobile controller 3 as described above, the processor 201 determines YES and proceeds to ACT 161.

In ACT 161, the processor 201 displays the completion screen on the touch panel 204. The completion screen is a screen for reporting to the customer that the settlement is completed.

If the completion screen is confirmed, the customer declares the confirmation by a predetermined operation such as a touch on a button represented in the completion screen. In response to this, the processor 201 proceeds to ACT 162. If elapsed time in a state in which the completion screen is displayed reaches a predetermined time, the processor 201 may proceed to ACT 162.

In ACT 162, the processor 201 displays the scanning screen for check-out on the touch panel 204. The scanning screen for check-out is a screen for reading the two-dimensional code TCO for check-out. The processor 201 starts, for example, the camera 205 and generates a scanning screen by overlapping a character message for prompting the customer to read the two-dimensional code TCO and a line indicating the reference of the position where the two-dimensional code TCO is to be held on the image obtained with the camera 205 accordingly.

If the scanning screen for check-out is displayed on the touch panel 204, the customer holds the camera 205 toward the two-dimensional code TCO so that the two-dimensional code TCO posted near the exit of the store is reflected on the scanning screen.

In ACT 163, the processor 201 waits for the reading of the two-dimensional code. At this point, the processor 201 repeatedly analyzes the image obtained with the camera 205 and tries to read the two-dimensional code. The two-dimensional code may be read by processes based on the smartphone POS app APD or by processes based on another application program for reading two-dimensional codes. Also, if the two-dimensional code is read, the processor 201 determines YES and proceeds to ACT 164.

In ACT 164, the processor 201 confirms whether the data indicated by the read two-dimensional code is the check-out data. If the data is not the check-out data, the processor 201 determines NO and returns to ACT 163. At this point, the processor 201 may display the screen for notifying the customer that the erroneous two-dimensional code is read on the touch panel 204.

If it is confirmed that the data indicated by the read two-dimensional code is the check-out data, the processor 201 determines YES in ACT 164 and proceeds to ACT 165.

In ACT 165, the processor 201 requests the check-out from the mobile controller 3.

The processor 31 of the mobile controller 3 notifies the settlement completion in ACT 244 in FIG. 18, and then proceeds to ACT 245.

In ACT 245, the processor 31 waits for the request of check-out. Also, if the check-out is requested from the user terminal 200 as described above, the processor 31 determines YES and proceeds to ACT 246.

In ACT 246, the processor 31 performs the check-out process. The check-out process is a process of clearing data stored in the main memory 32 and the auxiliary storage unit 33 in order to manage the transaction to be processed. The virtual POS server 2 may end the process relating to the corresponding transaction in response to the completion of the settlement and may end the process relating to the transaction in response to the instruction from the mobile controller 3. In the latter case, the processor 31 makes the above instruction to the virtual POS server 2 in the check-out process. The history database indicating the history of the operation of the user including an erroneous barcode scanning and the like may be managed by the store server 1, the virtual POS server 2, the mobile controller 3, another server, (not illustrated) or the like. In this case, in the check-out process, the processor 31 performs a process for updating the history database so that the history of the operation relating to the transaction at this time is reflected.

In ACT 247, the processor 31 notifies the completion of check-out to the user terminal 200. The processor 31 ends the information processes illustrated in FIGS. 15 to 18.

The processor 201 of the user terminal 200 requests the check-out in ACT 165 in FIG. 14, and then proceeds to ACT 166.

In ACT 166, the processor 201 waits for the notification of the check-out completion. If the check-out completion is notified from the mobile controller 3 as described above, the processor 201 determines YES and proceeds to ACT 167.

In ACT 167, the processor 201 clears various data that is temporarily used regarding the shopping at this time such as check-in data stored in ACT 107 in FIG. 10. Then, the processor 201 returns to ACT 101 in FIG. 10.

As described above, if the sales data transmitted by performing ACT 331 in FIG. 21 by the processor 21 of the virtual POS server 2 is transmitted to the store server 1 by the in-store communication network 7, the communication interface 14 receives the corresponding sales data. Then, the processor 11 determines YES in ACT 402 in response to this, and proceeds to ACT 405.

In ACT 405, the processor 11 updates the inventory database DBAB so that the decrease in the inventory by the sales is reflected. The processor 11 changes, for example, the number of inventories included in the inventory information described in the inventory database DBAB in correlation with the merchandise code illustrated in the sales data to the number obtained by subtracting the quantity that forms a set in the sales data with the same merchandise code from the number of inventories. Then, the processor 11 returns to the standby state of ACTS 402 and 403.

Meanwhile, if the merchandise arrives, the clerk designates the arrival by using an information terminal that is not illustrated in FIG. 1. That is, the clerk inputs the merchandise code of the arrived merchandise and the number of the arrived merchandise to the information terminal. Then, the information terminal transmits arrival notification data including a set of the merchandise code and the number of arrivals to the store server 1. If the arrival notification data is transmitted to the store server 1 by the in-store communication network 7, the communication interface 14 receives the corresponding arrival notification data. Also, the processor 11 determines YES in ACT 403 in response to this and proceeds to ACT 406.

In ACT 406, the processor 11 updates the inventory database DBAB so that the increase of the inventory by the arrival is reflected. The processor 11 changes, for example, the number of inventories included in the inventory information described in the inventory database DBAB in correlation with the merchandise code indicated in the sales data to the number obtained by adding the quantity that forms a set in the arrival notification data with the same merchandise code to the number of inventories.

In ACT 407, the processor 11 confirms whether there is a reservation relating to the arrived merchandise. For example, if any one of the merchandise codes included in the arrival notification data is not identical to the merchandise code set in any one of the fields FBC of the data record REA included in the reservation database DBAC, the processor 11 determines NO and returns to the standby state of ACTS 402 to 403 as it is. However, if any one of the merchandise codes included in the arrival notification data is identical to the merchandise code set in any one of the fields FBC of the data record REA included in the reservation database DBAC, the processor 11 determines YES in ACT 407 and proceeds to ACT 408.

In ACT 408, the processor 11 performs the process for notifying the arrival to the reserved customer. The processor 11 extracts, for example, the data record REA regarding each merchandise code included in the arrival notification data, in which the merchandise code is set in the field FBC and which a notification flag set in the field FBF indicates that notification is not made, from the reservation database DBAC. Also, the processor 11 notifies arrival of the reserved merchandise to the predetermined contact information regarding the user identified with the user code set in the field FBB of the extracted data record REA. The notification can be performed, for example, by e-mail, push notification to the user terminal 200, or the like. The contact information may be described, for example, in correlation with the user code, in the user database provided in the database group DBAA. In addition, if the notification is performed in this manner, the processor 11 updates the notification flag set in the field FBF of the corresponding data record REA in a state indicating the notification completion.

The processor 11 performs the information process based on the store management app APA so that the computer including the processor 11 as the central portion functions as a notification unit.

If the notification relating to all of the extracted data records REA is finished, the processor 11 returns to the standby state of ACTS 402 and 403.

The customer who receives the arrival notification can go to the store to receive the merchandise.

As above, according to the present embodiment, the merchandise that is out of stock can be registered as a target of the transaction together with the merchandise to be purchased as the reserved merchandise and purchased. Accordingly, an out-of-stock merchandise can be easily reserved.

In the merchandise sales processing system according to the present embodiment, the merchandise that is out of stock is registered as the reserved merchandise in response to the instruction by the customer. Accordingly, the customer can determine whether to register the merchandise as the reserved merchandise after confirming that the designated merchandise is out of stock and register the merchandise as the reserved merchandise if necessary.

The merchandise sales processing system according to the present embodiment notifies the arrival to the customer correlated with the arrived reserved merchandise. Accordingly, if the reserved merchandise arrives, the arrival can be promptly notified to the customer who reserves the reserved merchandise. If the customer quickly receives the reserved merchandise in response to the notification, the waiting time until the customer receives the reserved merchandise can be reduced to the minimum.

The merchandise sales processing system according to the present embodiment determines the reserved merchandise in response to the designation by the customer among the merchandise that match the condition designated by the customer. Therefore, even if the customer cannot find the desired merchandise in the store, the merchandise can be registered as the reserved merchandise.

According to the embodiment, various modifications as follows are possible.

For example, if the shopping is realized by using the cart terminal 300 instead of the user terminal 200, the user terminal 200 can be also read as the cart terminal 300. That is, the processor 302 of the cart terminal 300 may perform substantially the same information processes as the information processes by the processor 201 of the user terminal 200. Here, in the case of the cart terminal 300, the processes of ACTS 104 to 107 in FIG. 10 may be omitted, for example, by storing at least a part of various kinds of data shown in the check-in data, in the main memory 303 or the auxiliary storage unit 304 in advance.

The designation of the merchandise registered as the reserved merchandise may be performed by any other means such as reading a barcode displayed on a shelf.

The embodiment can be realized as a merchandise sales processing system that does not provide the smartphone POS service. In this case, operations regarding the designation of the merchandise and registration of the corresponding merchandise as the reserved merchandise may be performed by a registration terminal or a settlement terminal in a face-to-face-type or full-self-service-type POS terminal or a semi-self-service-type POS system. Also, this operation may be performed by the clerk.

If the customer designates the settlement of the reserved merchandise to be performed when receiving the reserved merchandise, the reserved merchandise may be excluded from the settlement target.

The reserved merchandise may be registered in only a part among a plurality of store systems.

The reservation database DBAC may be stored in the auxiliary storage unit 23 of the virtual POS server 2, the auxiliary storage unit 33 of the mobile controller 3, or an auxiliary storage unit included in the server device that is not illustrated in FIG. 1. Also, at least a part of the inventory management processes illustrated in FIG. 27 may be performed by the processor of the device that includes an auxiliary storage unit that stores the reservation database DBAC.

The notification relating to the arrival of the reserved merchandise may not be performed. In this case, for example, measures such as printing a reservation slip showing the arrival schedule or the guideline by a printer of the checkout machine 5, enabling the touch panel 204 of the user terminal 200 to display a screen showing the reservation slip may be taken.

The function of the mobile controller 3 is integrated into the virtual POS server 2, and the mobile controller 3 does not have to be provided.

It is also possible to realize a part or all of the functions realized by the processor 11, 21, 31, 201, and 302 with the information process, by hardware that performs the information processes that are not based on a program such as a logic circuit. Further, the above functions can be realized by combining software control with the above hardware such as the logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A merchandise sales processing system for a store, the merchandise sales processing system comprising:
   one or more processors and one or more memory devices configured to store instructions thereon that, when executed by the one or more processors, cause the one or more processors to:
   display a shopping graphical user interface on a portable device, the shopping graphical user interface including a merchandise scanning button, a search button, and a payment button;
   display a merchandise registration graphical user interface on the portable device in response to selection of the merchandise scanning button;
   while displaying the merchandise registration graphical user interface, scan an item of merchandise using a sensor of the portable device;
   register the item of merchandise as merchandise to be purchased;
   display the shopping graphical user interface on the portable device including a list of the merchandise to be purchased;
   display a search graphical user interface in response to selection of the search button;
   receive a search input regarding a respective item of merchandise via the search graphical user interface;
   display a results graphical user interface on the portable device that provides a user with an option (i) to request guidance to the respective item of merchandise within the store if the respective item is in stock or (ii) to request to reserve the respective item of merchandise if the respective item of merchandise is out of stock;
   receive a request to reserve the respective item as a reserved item via the results graphical user interface;
   perform settlement of the list of the merchandise to be purchased in response to selection of the payment button; and
   provide a notification to the user in response to the reserved item coming in stock and becoming available for pickup from the store.

2. The merchandise sales processing system of claim 1, wherein the one or more memory devices are further configured to store instructions thereon that, when executed by the one or more processors, cause the one or more processors to:
   register the reserved item as the merchandise to be purchased in response to the request to reserve;
   display the shopping graphical user interface on the portable device including the list of the merchandise to be purchased including the reserved item, wherein the shopping graphical user interface provides a reservation icon next to the reserved item; and
   perform settlement of the list of the merchandise to be purchased including the reserved item in response to selection of the payment button.

3. The merchandise sales processing system of claim 1, wherein at least one processor of the one or more processors is a processor of the portable device.

4. The merchandise sales processing system of claim 1, wherein at least one processor of the one or more processors is a processor of a server.

5. The merchandise sales processing system of claim 1, wherein the portable device includes at least one of a portable user device or a cart terminal.

6. A merchandise sales processing system for a store, the merchandise sales processing system comprising:
   one or more processors and one or more memory devices configured to store instructions thereon that, when executed by the one or more processors, cause the one or more processors to:
   display one or more graphical user interfaces on a portable device, the one or more graphical user interfaces providing a merchandise scanning area, a search button, a payment button, a list of merchandise to be purchased, and search results;
   scan an identifier of an item of merchandise within the merchandise scanning area using a sensor of the portable device;
   register the item of merchandise as merchandise to be purchased;
   display the item in the list of merchandise to be purchased;
   receive a search input regarding a respective item of merchandise following selection of the search button;
   display the search results based on the search input, the search results providing at least one of (i) guidance to the respective item within the store or (ii) an ability to reserve the respective item if the respective item is out of stock;
   receive a request to reserve the respective item as a reserved item from a user;
   perform settlement of the list of merchandise to be purchased following selection of the payment button; and
   provide a notification to the user in response to the reserved item coming in stock and becoming available for pickup from the store.

7. The merchandise sales processing system of claim 6, wherein a single graphical user interface of the one or more graphical user interfaces facilitates accessing the merchandise scanning area, the search button, the payment button, and the list of merchandise to be purchased.

8. The merchandise sales processing system of claim 7, wherein the single graphical user interface provides a merchandise scanning button that directs the user to a merchandise scanning graphical user interface of the one or more graphical user interfaces.

9. The merchandise sales processing system of claim 6, wherein at least one processor of the one or more processors is a processor of the portable device.

10. The merchandise sales processing system of claim 6, wherein at least one processor of the one or more processors is a processor of a server.

11. The merchandise sales processing system of claim 6, wherein the portable device includes at least one of a portable user device or a cart terminal.

12. The merchandise sales processing system of claim 6, wherein the one or more memory devices are further configured to store instructions thereon that, when executed by the one or more processors, cause the one or more processors to:
- register the reserved item as merchandise to be purchased in response to the request to reserve;
- display the reserved item in the list of merchandise to be purchased; and
- perform settlement of the list of merchandise to be purchased including the reserved item following selection of the payment button.

13. The merchandise sales processing system of claim 12, wherein the one or more memory devices are further configured to store instructions thereon that, when executed by the one or more processors, cause the one or more processors to provide a reservation icon next to the reserved item in the list of merchandise to be purchased.

14. A merchandise sales processing system for a store, the merchandise sales processing system comprising:
- one or more processors and one or more memory devices configured to store instructions that, when executed by the one or more processors, cause the one or more processors to:
  - display one or more graphical user interfaces on a portable device, the one or more graphical user interfaces providing a merchandise scanning area, a search button, a payment button, a list of merchandise to be purchased, and search results, wherein a single graphical user interface of the one or more graphical user interfaces facilitates accessing the merchandise scanning area, the search button, the payment button, and the list of merchandise to be purchased;
  - scan an identifier of an item of merchandise within the merchandise scanning area using a sensor of the portable device;
  - register the item of merchandise as merchandise to be purchased;
  - display the item in the list of merchandise to be purchased;
  - receive a search input regarding a respective item of merchandise following selection of the search button;
  - display the search results based on the search input, wherein the search results provide at least one of (i) guidance to the respective item within the store or (ii) an ability to reserve the respective item if the respective item is out of stock;
  - receive a request to reserve the respective item as a reserved item from a user;
  - provide a notification to the user in response to the reserved item coming in stock and becoming available for pickup from the store; and
  - perform settlement of the list of merchandise to be purchased following selection of the payment button.

15. The merchandise sales processing system of claim 14, wherein the single graphical user interface provides a merchandise scanning button that directs a user to a merchandise scanning graphical user interface of the one or more graphical user interfaces.

16. The merchandise sales processing system of claim 14, wherein at least one processor of the one or more processors is a processor of the portable device.

17. The merchandise sales processing system of claim 14, wherein at least one processor of the one or more processors is a processor of a server.

18. The merchandise sales processing system of claim 14, wherein the portable device includes at least one of a portable user device or a cart terminal.

* * * * *